United States Patent
Wang et al.

(10) Patent No.: US 11,283,687 B2
(45) Date of Patent: Mar. 22, 2022

(54) METHOD AND APPARATUS FOR A NETWORK FUNCTION TO SUPPORT SERVICE DISCOVERY USING INTIMACY INFORMATION

(71) Applicant: Telefonaktiebolaget LM Ericsson (publ), Stockholm (SE)

(72) Inventors: Cheng Wang, Shanghai (CN); Peng Li, Shanghai (CN); Xinyu Zhang, Shanghai (CN); Xiaojun Yin, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 16/342,526

(22) PCT Filed: Sep. 10, 2018

(86) PCT No.: PCT/CN2018/104829
§ 371 (c)(1),
(2) Date: Apr. 16, 2019

(87) PCT Pub. No.: WO2019/153738
PCT Pub. Date: Aug. 15, 2019

(65) Prior Publication Data
US 2020/0396132 A1    Dec. 17, 2020

(30) Foreign Application Priority Data
Feb. 6, 2018    (WO) ............... PCT/CN2018/075418

(51) Int. Cl.
*G06F 15/173* (2006.01)
*H04L 41/12* (2022.01)
(Continued)

(52) U.S. Cl.
CPC .......... *H04L 41/12* (2013.01); *H04L 41/0853* (2013.01); *H04L 41/0893* (2013.01); *H04L 41/5058* (2013.01)

(58) Field of Classification Search
CPC ..................... H04L 67/16; H04L 41/5058
(Continued)

(56) References Cited

U.S. PATENT DOCUMENTS

| 2016/0006696 | A1 | 1/2016 | Donley et al. |
| 2020/0028920 | A1* | 1/2020 | Livanos ................. H04W 8/26 |
| 2020/0235995 | A1* | 7/2020 | Zhu ........................ H04L 67/10 |

FOREIGN PATENT DOCUMENTS

| CN | 104202264 A | 12/2014 |
| CN | 107295049 A | 10/2017 |

(Continued)

OTHER PUBLICATIONS

Nokia, Alcatel-Lucent et al., Pseudo-CR on NF Service Discovery and Selection Requirements, Aug. 21-25, 2017, All pages (Year: 2017).*

(Continued)

*Primary Examiner* — Hee Soo Kim
(74) *Attorney, Agent, or Firm* — Nicholson De Vos Webster & Elliott LLP

(57) ABSTRACT

Embodiments of the present disclosure provide methods, apparatus for network function (NF) to support service discovery in a service based architecture. In one embodiment, a method is disclosed to support service discovery using intimacy information and it is performed at a first NF in a network system. In the method, the first NF receives a service discovery request from a second NF, where the service discovery request includes intimacy information of the second NF. The first NF then sends a service discovery response to the second NF, and the service discovery (Continued)

response includes information of the at least one third NF or at least one sub-instance of the third NF.

16 Claims, 17 Drawing Sheets

(51) Int. Cl.
   *H04L 41/0853* (2022.01)
   *H04L 41/0893* (2022.01)
   *H04L 41/50* (2022.01)

(58) Field of Classification Search
   USPC .......................................................... 709/223
   See application file for complete search history.

(56) References Cited

FOREIGN PATENT DOCUMENTS

RU           2640724 C1      1/2018
WO      2017/167185 A1     10/2017

OTHER PUBLICATIONS

Notification of Reason for Refusal, KR App. No. 10-2019-7012568, dated Oct. 16, 2019, 21 pages (11 pages of English Translation and 10 pages of Original Document).

Communication pursuant to Article 94(3) EPC, EP App. No. 18869454.1, dated Sep. 25, 2020, 6 pages.

International Preliminary Report on Patentability, PCT App. No. PCT/CN2018/104829, dated Aug. 20, 2020, 5 pages.

Ericsson, "Pseudo-CR on Service Discovery and Registration using NRF service", 3GPP TR 29.891-v0.3.0, 3GPP TSG CT4 Meeting #79, C4-174083, Krakow, Poland, Aug. 21-25, 2017, 5 pages.

Nokia et al., "Pseudo-CR on NF Service Discovery and Selection Requirements", 3GPP TR 29.891 v0.3.0, 3GPP TSG CT4 Meeting #79, C4-174233, Krakow, Poland, Aug. 21-25, 2017, 4 pages.

Nokia et al., "Using NRF for UPF discovery", S2-181271, SA WG2 Meeting #125, Gothenburg, Sweden, Jan. 22-26, 2018, 6 pages.

Supplementary European Search Report and Written Opinion, EP App. No. 18869454.1, dated Nov. 12, 2019, 12 pages.

Notification of Reason for Refusal, KR App. No. 10-2019-7012568, dated Feb. 26, 2020, 22 pages (12 pages of English Translation and 10 pages of Office Action).

International Search Report and Written Opinion for Application No. PCT/CN2018/104829, dated Nov. 28, 2018, 9 pages.

"3rd Generation Partnership Project; Technical Specification Group Services and System Aspects; System Architecture for the 5G System; Stage 2 (Release 15)," Dec. 2017, 181 pages, 3GPP TS 23.501, Version 15.0.0, 3GPP Organizational Partners.

"3rd Generation Partnership Project; Technical Specification Group Services and System Aspects; Procedures for the 5G System; Stage 2 (Release 15)," Dec. 2017, 258 pages, 3GPP TS 23.502, Version 15.0.0, 3GPP Organizational Partners.

First Office Action, CN App. No. 201880004205.3, dated Oct. 30, 2020, 15 pages (8 pages of English Translation and 7 pages of Original Document).

Office Action, RU App. No. 2020126196/07, dated Feb. 16, 2021, 9 pages of Original Document Only.

European Communication pursuant to Article 94(3) EPC, EP App. No. 18869454.1, dated Apr. 21, 2021, 6 pages.

Nokia, "Access Restriction for NR", C4-174223, 3GPP TSG CT4 Meeting #79, Aug. 21-25, 2017, 2 pages.

Notice of Allowance, RU App. No. 2020126196/07, dated Jun. 23, 2021, 12 pages of Original Document Only.

Notice of Allowance, KR App. No. 10-2019-7012568, dated Nov. 25, 2020, 4 pages (2 pages of English Translation and 2 pages of Original Document).

Notice of Final Rejection, KR App. No. 10-2019-7012568, dated Sep. 28, 2020, 9 pages (5 pages of English Translation and 4 pages of Original Document).

Second Office Action, CN App. No. 201880004205.3, dated May 26, 2021, 18 pages (11 pages of English Translation and 7 pages of Original Document).

* cited by examiner

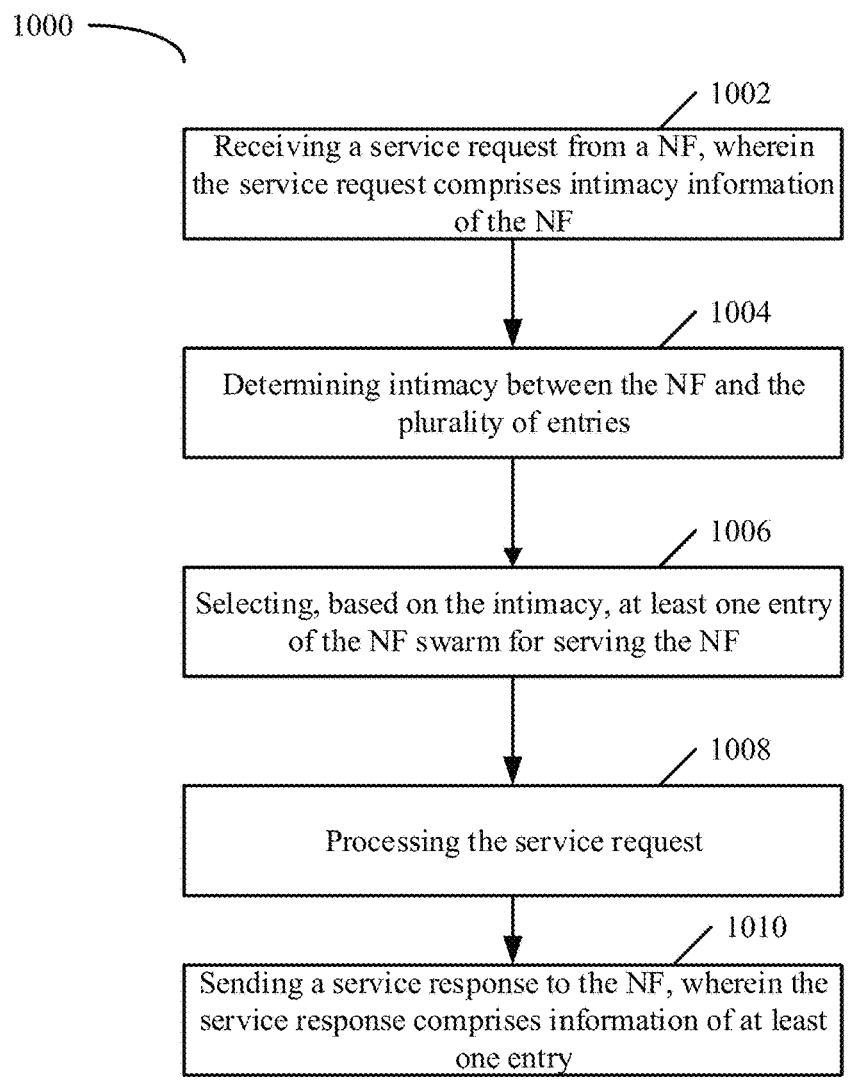

METHOD AND APPARATUS FOR A NETWORK FUNCTION TO SUPPORT SERVICE DISCOVERY USING INTIMACY INFORMATION

CROSS-REFERENCE TO RELATED APPLICATIONS

This application is a National stage of International Application No. PCT/CN2018/104829, filed Sep. 10, 2018, which claims priority to International Application No. PCT/CN2018/075418, filed Feb. 6, 2018, which are hereby incorporated by reference.

TECHNICAL FIELD

The non-limiting and exemplary embodiments of the present disclosure generally relate to the technical field of communications, and specifically to methods, apparatuses for a network function.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for next generation (5G) network such as new radio (NR) has been proposed. The 5G core network employs service based architecture (SBA). FIG. 1 shows a high level architecture of 5G core network SBA. The service-based architecture (SBA) under development for the next generation network can restructure the core network control plane and divide it into multiple independent modules with decoupled functions that can be updated individually. The introduction of the service-based interface protocols and network-function repository function (NRF) may enable the function modules to be used flexibly. In the SBA, service discovery may be provided for individual network functions (NFs) by a NRF, so as to meet different service requirements. Each NF may provide at least one NF service. As shown in FIG. 1, 5G core network SBA may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), and NRF (NF Repository Function).

NRF may support NF service registration and NF service discovery. For the NRF to properly maintain information of available NF instances and their supported services, each NF instance informs the NRF of a list of NF services that it supports and other NF instance information during the NF service registration. Each NF instance may have a NF profile. The NF profile may include NF instance identifier (ID), NF type, Public Land Mobile Network (PLMN) ID, network slice related identifier(s), Fully Qualified Domain Name (FQDN) or IP address of NF, NF capacity information, names of supported services, endpoint information of instance(s) of each supported service, etc.

The NF service discovery may be implemented by using the NRF. The NF selection consists in selecting one NF instance among the NF instance(s) discovered during the NF service discovery. The NF selection is implemented by the requester NF, e.g. the SMF selection is supported by the AMF.

However, in 5G network, the NRF may be expected to be deployed in a central data center as shown in FIG. 4 and such deployment may result in many problems related to the service discovery. Therefore, it is desirable to provide a new solution for service discovery.

SUMMARY

Various embodiments of the present disclosure mainly aim at providing methods, apparatuses and computer programs for service discovery. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided implemented at a first network function (NF) in a network. The method may comprise: receiving intimacy information of a third NF from the third NF, or receiving intimacy information of a sub-instance of the third NF from the sub-instance of the third NF; and storing the received intimacy information in the first NF. The intimacy information comprises at least one of: data center information, network topology information, and geography location information.

In a second aspect of the disclosure, there is provided a method implemented at a second network-function (NF) in a network. The method may comprise: sending a service discovery request to a first NF, wherein the service discovery request comprises intimacy information of the second NF; and receiving a service discovery response from the first NF, wherein the service discovery response comprises information of at least one third NF or at least one sub-instance of the third NF, since intimacy information of the at least one third NF or the at least one sub-instance of the third NF corresponding to the intimacy information of the second NF is stored in the first NF. The intimacy information of the second NF comprises at least one of: data center information, network topology information, and geography location information.

In a third aspect of the disclosure, there is provided a method implemented at a third network function (NF) in a network. The method may comprise: sending intimacy information of the third NF or a sub-instance of the third NF to a first NF; and receiving, from the first NF, a response of acknowledgement for the storing of the received intimacy information in the first NF. The intimacy information comprises at least one of: data center information, network topology information; and geography location information.

In a fourth aspect of the disclosure, there is provided a method implemented at a first network function (NF). The method may comprise: receiving, from a second NF, a service discovery request, wherein the service discovery request comprises intimacy information of the second NF; and sending to the second NF a service discovery response. The service discovery response comprises information of at least one third NF or at least one sub-instance of the third NF, since intimacy information of the at least one third NF or the at least one sub-instance of the third NF corresponding to the intimacy information of the second NF is stored in the first NF. The intimacy information of the second NF comprises at least one of: data center information, network topology information, and geography location information.

In a fifth aspect of the disclosure, there is provided an apparatus for a first network function (NF) in a network. The apparatus may comprise a processor and a memory coupled to the processor. The memory may contain instructions executable by the processor, whereby the apparatus is operative to perform the method according to the fourth aspect of the disclosure.

In a sixth aspect of the disclosure, there is provided an apparatus for a second network-function (NF) in a network. The apparatus may comprise a processor and a memory coupled to the processor. The memory may contain instructions executable by the processor, whereby the apparatus is operative to perform the method according to the second aspect of the disclosure.

In a seventh aspect of the disclosure, there is provided an apparatus for a third network function (NF) in a network. The apparatus may comprise a processor and a memory coupled to the processor. The memory may contain instructions executable by the processor, whereby the apparatus is operative to perform the method according to the third aspect of the disclosure.

In an eighth aspect of the disclosure, there is provided an apparatus for a first network-function (NF) in a network system. The apparatus may comprise a processor and a memory coupled to the processor. The memory may contain instructions executable by the processor, whereby the apparatus is operative to perform the method according to the first aspect of the disclosure.

In a ninth aspect of the disclosure, there is provided a computer program, comprising instructions which, when executed on at least one processor, cause the at least one processor to carry out the method according to the first aspect of the disclosure.

In a tenth aspect of the disclosure, there is provided a computer program, comprising instructions which, when executed on at least one processor, cause the at least one processor to carry out the method according to the second aspect of the disclosure.

In an eleventh aspect of the disclosure, there is provided a computer program, comprising instructions which, when executed on at least one processor, cause the at least one processor to carry out the method according to the third aspect of the disclosure.

In a twelfth aspect of the disclosure, there is provided a computer program, comprising instructions which, when executed on at least one processor, cause the at least one processor to carry out the method according to the fourth aspect of the disclosure.

According to the various aspects and embodiments as mentioned above, intimacy information of a NF providing a network service can be registered with the network service, thus enabling the provider of the network service can be discovered and selected according to the information of intimacy between the discovery requester and the provider.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 9 illustrates a flowchart of a method implemented at a third NF according to an embodiment of the present disclosure;
FIG. 10 illustrates a flowchart of a method implemented at a NF swarm according to an embodiment of the present disclosure.

DETAILED DESCRIPTION

Figure 1:
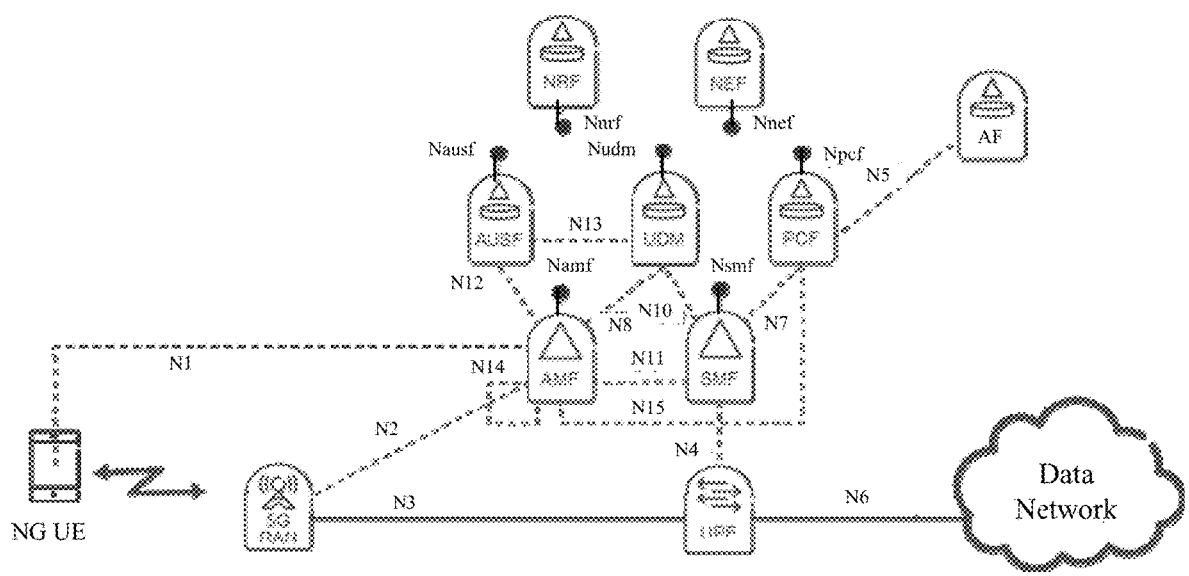
FIG. 1 illustrates a schematic 5G core network with SBA.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in a wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols such as NR, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network function" refers to any suitable function which can be implemented in a network device of a wireless/wired communication network via which a terminal device can access the network and receives services therefrom. In the wireless communication network, the network device may refer to a base station (BS), an access point (AP), radio network controllers (RNCs) or base station controllers (BSCs), Mobility Management Entity (MME), Serving GateWay (SGW), Packet Data Network GateWay (PGW), Policy and Charging Rules Function (PCRF), Home Subscriber Server (HSS) or any other suitable device in the wireless communication network. For example, in 5G network, the network function may comprise AMF, SMF, AUSF, UDM, PCF, AF, NEF, and NRF. It is noted that the network function may comprise different network elements depending on the type of network.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

For illustrative purposes, several embodiments of the present disclosure will be described in the context of a 5G core network. Those skilled in the art will appreciate, however, that the concept and principle of the several embodiments of the present disclosure may be more generally applicable to any other suitable networks such as wireless or wired network.

In 5G core network as shown in FIG. 1, a NF may provide at least one NF service and a NF may request a certain NF service. In this case, the requesting NF may be referred to as "NF service consumer", and the NF providing the NF service may be referred to as "NF service provider". As described above, the NF services provided by the NF service providers may be registered in the NRF. In a case, the NRF can be provider of the NF service and the NF making use of the NRF service may be a NF service consumer, no matter the NF could also be a service provider in another case. In another case, the NRF may be another NRF's NF consumer.

The functionality of NRF may be to negotiate how and locate where a service can be utilized by its consumer e.g. another NF/service instance. Per 3GPP TS 23.502 definition, NRF supports the following functionality, the disclosure of which is incorporated by reference herein in its entirety:

Supports service discovery function. It may receive NF Discovery Request from a NF instance, and provides the information of the discovered NF instances (be discovered) to the NF instance.

Maintains the NF profile of available NF instances and their supported services.

Table 5.2.7.1-1 of 3GPP TS 23.502 shows the services provided by NRF:

| Service Name | Service Operations | Operation Semantics | Example Consumer(s) |
|---|---|---|---|
| Nnrf_NFManagement | NFRegister | Request/Response | AMF, SMF, UDM, AUSF, NEF, PCF, SMSF, NSSF |
| | NFUpdate | Request/Response | AMF, SMF, UDM, AUSF, NEF, PCF, SMSF, NSSF |
| | NFDeregister | Request/Response | AMF, SMF, UDM, AUSF, NEF, PCF, SMSF, NSSF |
| | NFStatusSubscribe | Subscribe/Notify | AMF, SMF, PCF, NEF, NSSF, SMSF, AUSF |
| | NFStatusNotify | | AMF, SMF, PCF, NEF, |

Table 5.2.7.1-1 of 3GPP TS 23.502 shows the services provided by NRF:

| Service Name | Service Operations | Operation Semantics | Example Consumer(s) |
| --- | --- | --- | --- |
| | NFStatusUnSubscribe | | NSSF, SMSF, AUSF AMF, SMF, PCF, NEF, NSSF, SMSF, AUSF |
| Nnrf_NFDiscovery | Request | Request/Response | AMF, SMF, PCF, NEF, NSSF, SMSF, AUSF |

Figure 2:
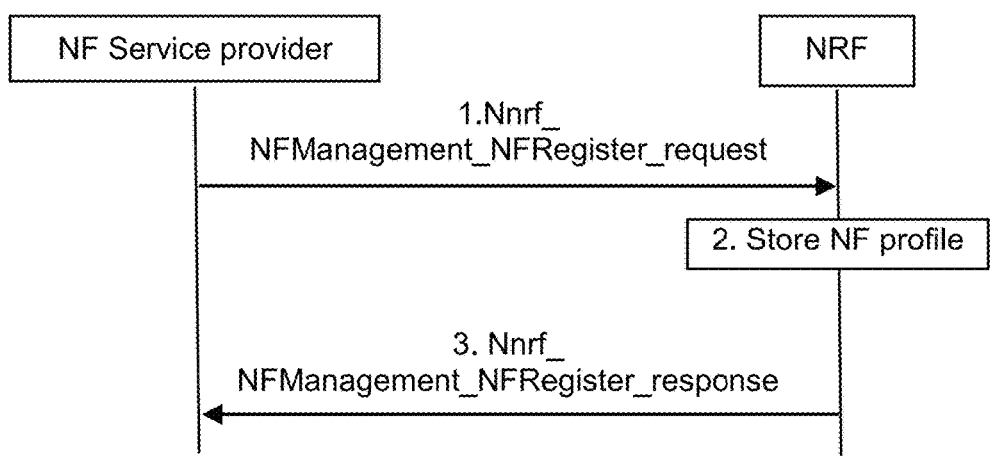
FIG. 2 schematically shows a service registration procedure in 5G core network.

Nnrf_NFManagement service enables the NF service provider to registration its NF profile e.g. supported NF services and other NF instance information in NRF and make it available to be discovered by other NF(s). FIG. 2 schematically shows a service registration procedure in 5G core network.

Figure 3:
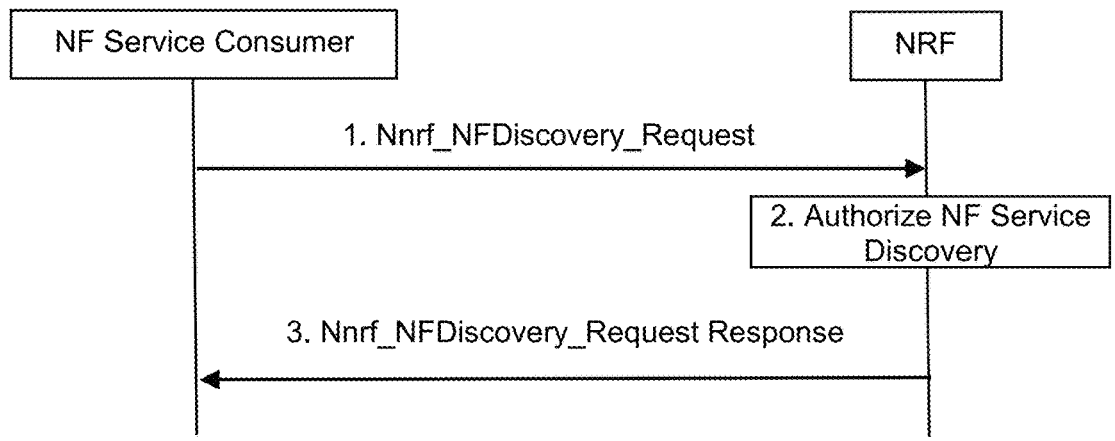
FIG. 3 schematically shows a service discover procedure in 5G core network.

Nnrf_NFDiscover service enables the NF service consumer to discover the service provided by the NF service provider by querying the NRF. FIG. 3 schematically shows a NF discover procedure in 5G core network.

Depending on the requesting NF and the target NF, different input parameters may be included in the discovery request to enable the NRF to match a target NF best serving the requesting NF.

It is noted that in addition to the services defined by the table 5.2.7.1-1 of 3GPP TS 23.502, the NRF may provide any other suitable services in other embodiments.

From a protocol level, HTTP/2 method is defined to support the NF service consumer to get IP address(es) or FQDN of the NF instance(s) or NF service(s) matching certain input criteria. Note that by using HTTP POST, it enables flexibility of different input parameters used for different NF discovery use cases.

In short, unless a local configuration of next hop NF information is available in a certain NF, the NF shall make use of NRF to find out the information like location and capability of next hop NF and related services it intends to use, and then proceed with traffic handling.

The 5G core network may be by birth designed for better cloud adoption. It is expected that there would be many data centers serving in the different level of network being deployed in the operators' network. A specific NF or NF services can be instantiated and deployed in many and distinct data centers (DCs) according to on demand requirements from operator, e.g. for its own operation efficiency or for new business model build-up.

Figure 4:
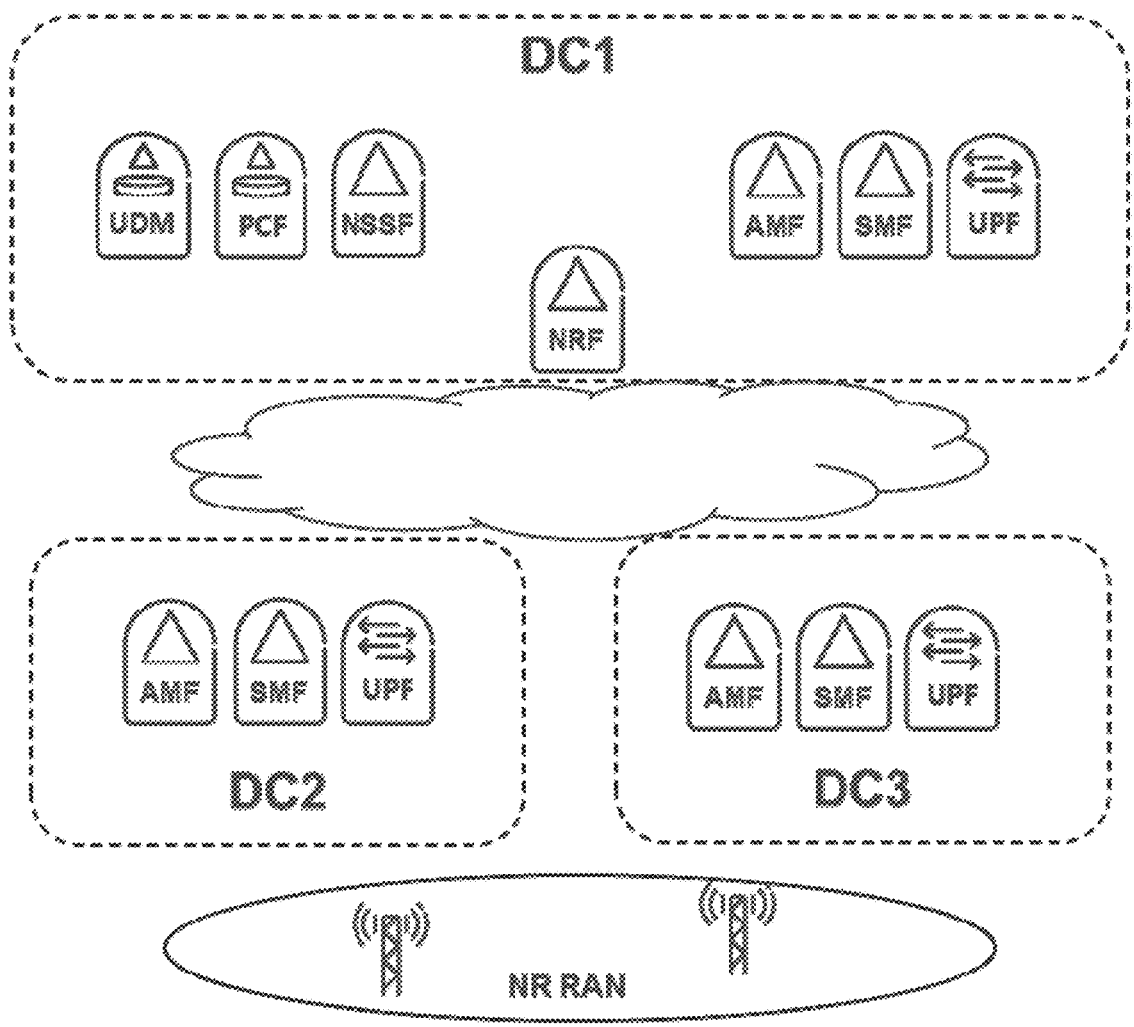
FIG. 4 schematically shows NF deployment cross DC in 5G core network.

For example, it can be expected that central control NF(s) or subscriber data base can be deployed in a center DC, while those traffic-intensive and latency-sensitive NF(s) can be deployed in a regional DC or edge DC. FIG. 4 schematically shows NF deployment cross DC in 5G core network.

NRF is key for control plan signaling path set up, as NF needs query NRF to find a proper next hop NF (or NF service) instance per traffic context.

It can then be a high volume of signaling expected for the service discovery traffic thus it may impact the latency performance for the traffic context and also overall network signaling performance eventually.

On the other hand, HTTP level Cache cannot help too much for signaling saving here as service discovery are implemented via HTTP POST method thus not cacheable in HTTP level. Thus, it can only rely on each NF application to implement its own specific signaling saving method, e.g. application level cache and such solution can be distinct from application to application. i.e. it is complicated to implemented cache in application level.

Therefore it is desirable to provide a new mechanism for service discovery to overcome at least one of above mentioned problems or other problems.

In the present disclosure, methods, apparatuses and computer program products are provided to support service discovery in the network. Though embodiments of the present disclosure can be implemented in the exemplary 5G core network shown in FIG. 1, it would be appreciated that embodiments of the disclosure are not limited to such a 5G core network.

Figure 5:
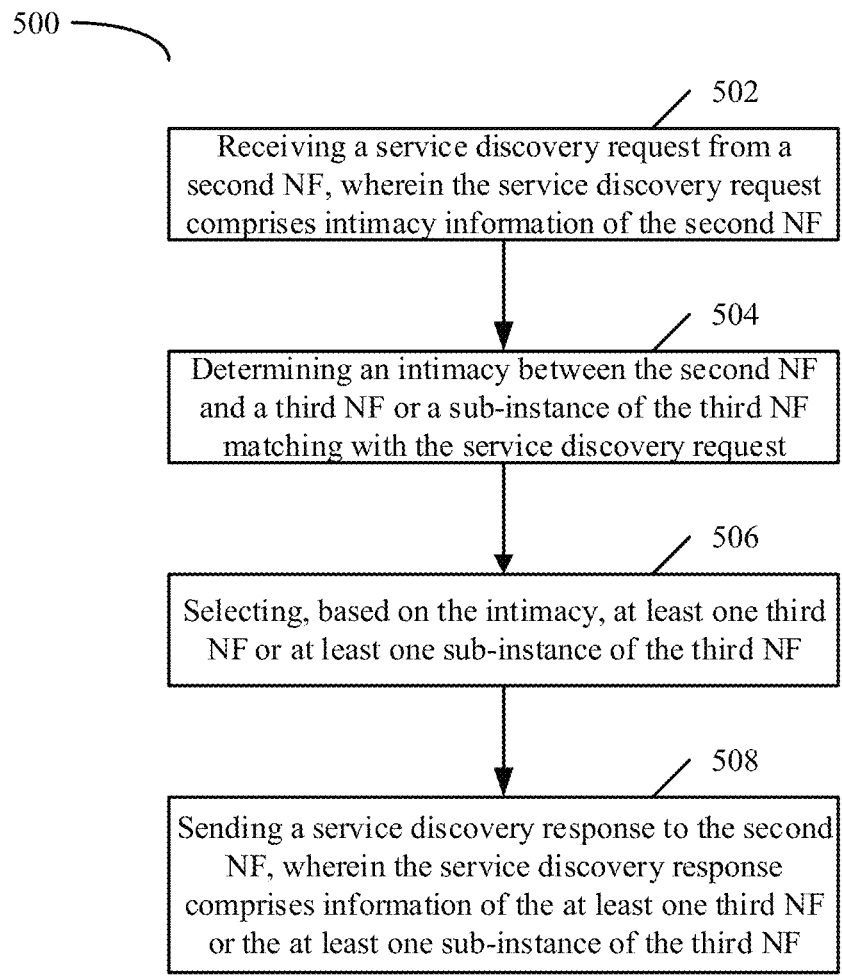
FIG. 5 illustrates a flowchart of a method implemented at a first NF according to an embodiment of the present disclosure.

Reference is now made to FIG. 5, which shows a flowchart of a method 500 according to an embodiment of the present disclosure. The method 500 may be implemented at a first NF (e.g., a NRF shown in FIG. 1).

As shown in FIG. 5, the method 500 may comprise: receiving a service discovery request from a second NF, wherein the service discovery request comprises intimacy information of the second NF at block 502; determining an intimacy between the second NF and a third NF or a sub-instance of the third NF matching with the service discovery request at block 504; selecting, based on the intimacy, at least one third NF or at least one sub-instance of the third NF at block 506; and sending a service discovery response to the second NF at block 508, wherein the service discovery response comprises information of at least one third NF or at least one sub-instance of the third NF.

In an embodiment, at block 502, the first NF may receive a service discovery request from a second NF, wherein the service discovery request comprises intimacy information of the second NF. The service discovery request may comprise a NF discovery request, a NRF discovery request or any other suitable service discovery request. The service discovery request may be triggered in various ways. For example, when the second NF determines that a terminal device attaches to a wireless network, or the terminal device originates traffic, or the terminal device terminates traffic, or the terminal device moves to another serving area, etc, the second NF may send a corresponding service discovery request to the first NF. As another example, when the second NF wants to register in the network and there are at least one NRF in the network, the second NF may send an NRF service discovery request to the first NF.

The intimacy information of the second NF may comprise any suitable information that can be used to determine the intimacy between the second NF and another entity such as another NF or NRF.

In an embodiment, the intimacy information may comprise at least one of data center information; geography location information; network topology information; network identity information; radio access technology capability; sub-network type; NF type; NF service type; subscriber information; quality of service information; network slice or DECOR (Dedicated Core Network) information; and a designated indicator assigned by an operator. For example, in 5G network, the data center information may comprise the identity of data center in which the second NF is located; the geography location information may comprise the location such as a location coordinate or indicator of the second NF; the network topology information may comprise sub-network info, regional code, cluster-ID, domain information (domain name or FQDN etc.), host and chassis information, UUID (universally unique identifier) in cloud deployment, IP address subnet; the network identity information may comprise the specific network ID assigned by operator; the radio access technology capability may comprise information of the radio access technology capability such as LTE and NR; the sub-network type may comprise EPC (Evolved Packet Core) and 5GC (5G core) for example; the NF type may comprise AMF and SMF, etc.; the NF service type may comprise the service type supported by the second NF such as Nnrf_NFManagement; the subscriber information may comprise IMSI range supporting EPC and/or 5GC; the quality of service information may comprise a quality level such as high bitrate or low bitrate; the network slice or DECOR information may comprise NSSAI (network slice selection assistance information) and UE-usage type; and the designated indicator assigned by an operator may be a code representing the intimacy information. It is noted that the above examples are only exemplary and the intimacy information may comprise any other suitable intimacy information in other embodiments.

Then at block 504, the first NF may determine an intimacy between the second NF and a third NF or a sub-instance of the third NF matching with the service discovery request. For example, the first NF may first determine which third NFs or sub-instances of the third NF matches with the service discovery request, and then determine the intimacy between the second NF and the matched third NF or the sub-instance of the matched third NF. The intimacy information of the third NF or the sub-instance of the third NF may be stored in the first NF or can be retrieved by the first NF. For example, the third NF or the sub-instance of the third NF may comprise its intimacy information in a service request such as a registration request or a service discovery request to be sent to the first NF, then the first NF may obtain and store the intimacy information of the third NF or the sub-instance of the third NF. Alternatively, the third NF or the sub-instance of the third NF may send directly its intimacy information to the first NF. In another example, when the intimacy information of the third NF or the sub-instance of the third NF is stored in a storage device, the first NF may retrieve it from the storage device. The intimacy information of the third NF or the sub-instance of the third NF may be similar to that of the second NF as described above.

For example, if the intimacy information of the second NF comprises the data center information and the second NF and the third NF or the sub-instance of the third NF are located in the same data center, then they may have a high intimacy, otherwise they may have a low intimacy. If the intimacy information of the second NF comprises the NF service type and the third NF or the sub-instance of the third NF supports the NF service type, then they may have a high intimacy, otherwise they may have a low intimacy. If the intimacy information of the second NF comprises the geography location information and the second NF and the third NF or the sub-instance of the third NF are located in the same geography area, then they may have a high intimacy, otherwise they may have a low intimacy. If the intimacy information of the second NF comprises the network topology information and the third NF or the sub-instance of the third NF is close to the second NF in terms of network topology, then they may have a high intimacy.

The intimacy between the second NF and the third NF or the sub-instance of the third NF may be determined in various ways. In an embodiment, the intimacy may be determined by physical distance closeness between the second NF and the third NF or the sub-instance of the third NF. For example, if the second NF and the third NF or the sub-instance of the third NF are located in the same geography area or neighboring and different geography areas, then they may have a high intimacy, otherwise they may have a low intimacy.

In another embodiment, the intimacy may be determined by topology closeness between the second NF and the third NF or the sub-instance of the third NF. For example, if the second NF and the third NF or the sub-instance of the third NF are near each other in terms of network topology, then they may have a high intimacy, otherwise they may have a low intimacy.

In another embodiment, the intimacy may be determined by a match of one or more of the intimacy information between the second NF and the third NF or the sub-instance of the third NF. For example, if the sub-network type is comprised in the intimacy information of the second NF and the third NF or the sub-instance of the third NF belongs to this sub-network type, then they may have a high intimacy, otherwise they may have a low intimacy. The similar operation for determining the intimacy based on the match may be applied to other intimacy information.

In another embodiment, the intimacy may be determined by running status of the third NF or the sub-instance of the third NF, such as latency, load status, operation and maintenance (O&M) status. For example, if there are two or more third NFs or sub-instances of the third NF that can serve the second NF, then the third NF or the sub-instance of the third NF with a lower load and/or low latency may have a high intimacy. As another example, if the third NF or the sub-instance of the third NF is being or planned to be maintained/upgraded, then the third NF or sub-instance of the third NF may have a low intimacy.

In addition, when two or more intimacy information are comprised in the service discovery request, the intimacy between the second NF and the third NF or the sub-instance of the third NF may be a combination (such as linear) of intimacy for example as below:

$$F(x_n) = \sum_{n=1}^{k} a_n x_n$$

where $x_n$ denotes the intimacy between the second NF and the third NF or the sub-instance of the third NF for the $n_{th}$ intimacy information, and $a_n$ denotes a weight which may be predefined or determined by machine learning. In addition, the intimacy may take any other suitable form in other embodiments.

At block 506, the first NF may select, based on the intimacy, at least one third NF or at least one sub-instance of the third NF. For example, first NF may select top N third NFs or sub-instances of the third NF with the highest intimacy, where N may be an integer and predefined or specified by the second NF in the service discovery request.

At block 508, the first NF may send a service discovery response to the second NF, wherein the service discovery response comprises information of at least one third NF or at least one sub-instance of the third NF. In an embodiment, the service discovery response may comprise information of the intimacy between the second NF and the at least one third NF or the at least one sub-instance of the third NF. The intimacy may represent a kind of priority and used by the second NF to select one of the at least one third NF or the at least one sub-instance of the third NF as a target NF.

Figure 6:
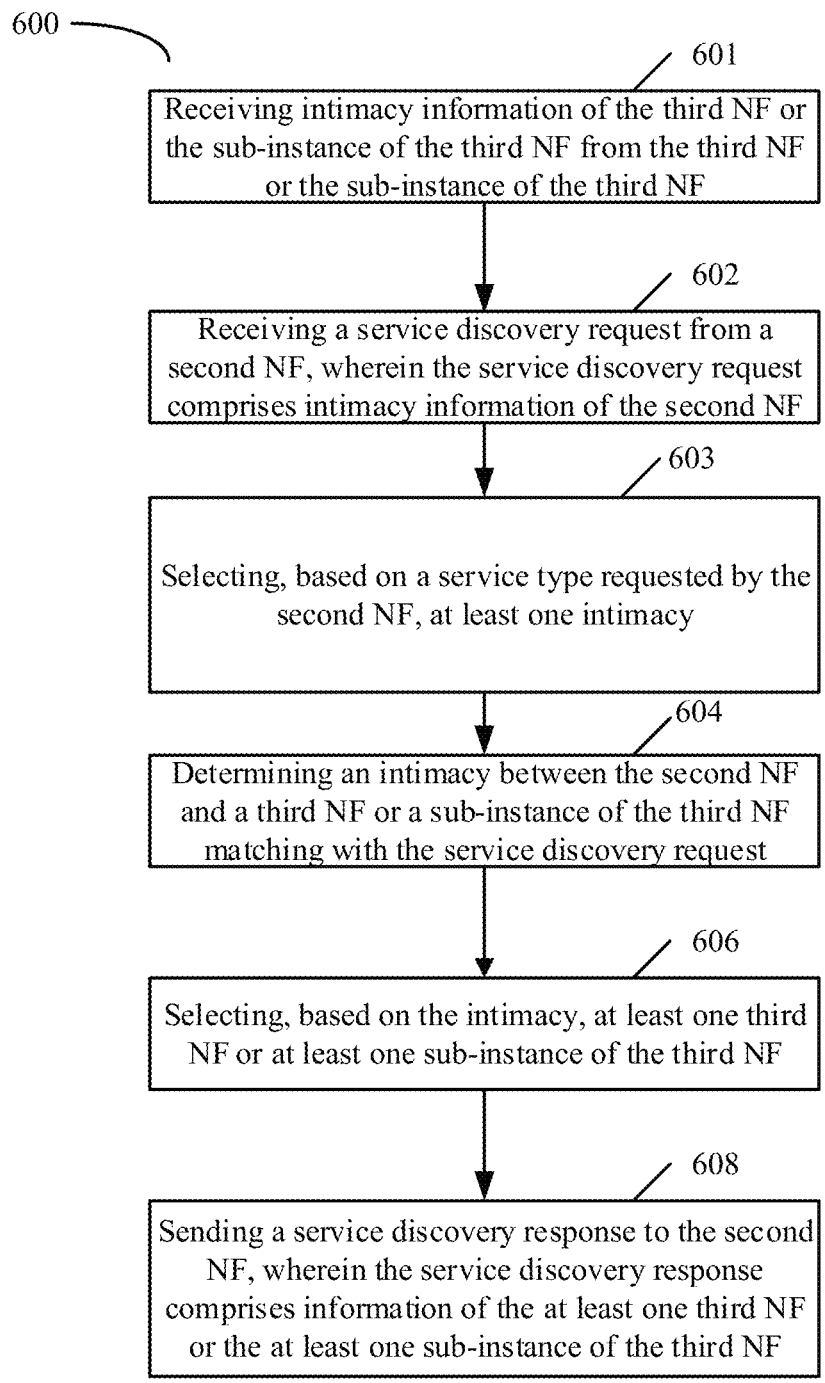
FIG. 6 illustrates a flowchart of a method implemented at a first NF according to another embodiment of the present disclosure.

FIG. 6 shows a flowchart of a method 600 according to an embodiment of the present disclosure. The method 600 may be implemented at a first NF (e.g., a NRF shown in FIG. 1). For some parts which have been described in the above embodiments, detailed description thereof is omitted here for brevity.

As shown in FIG. 6, the method 600 may comprise: receiving intimacy information of the third NF or the sub-instance of the third NF from the third NF or the sub-instance of the third NF at block 601; receiving a service discovery request from a second NF, wherein the service discovery request comprises intimacy information of the second NF at block 602; selecting, based on the service type requested by the second NF, at least one intimacy for determining the at least one third NF or at least one sub-instance of the third NF matching with the service discovery request at block 603; determining an intimacy between the second NF and a third NF or a sub-instance of the third NF matching with the service discovery request at block 604; selecting, based on the intimacy, at least one third NF or at least one sub-instance of the third NF at block 606; and sending a service discovery response to the second NF at block 608, wherein the service discovery response comprises information of at least one third NF or at least one sub-instance of the third NF. The blocks 602, 604, 606 and 608 are similar to blocks 502, 504, 506 and 508 of FIG. 5, detailed description thereof is omitted here for brevity.

As shown in FIG. 6, the method 600 may start at block 601 where the first NF receives intimacy information of the third NF or the sub-instance of the third NF from the third NF or the sub-instance of the third NF. For example, the third NF or the sub-instance of the third NF may send a service request such as a registration request or a service discovery request to the first NF which may comprise its intimacy information. Alternatively, the third NF or the sub-instance of the third NF may send directly its intimacy information to the first NF. The intimacy information of the third NF or the sub-instance of the third NF may be similar to that of the second NF as described above.

At block 602, the first NF may receive a service discovery request from a second NF, wherein the service discovery request comprises intimacy information of the second NF as described above.

At block 603, the first NF may select, based on the service type requested by the second NF, at least one intimacy for determining the at least one third NF or at least one sub-instance of the third NF matching with the service discovery request. For example, if the service is a delay sensitive service, then the first NF may use physical distance closeness, topology closeness and/or the running status as the intimacy. As another example, if the service is a video service, then the first NF may use the running status as the intimacy, i.e., the first NF may select the third NF(s) with lower load. It is noted that the above examples are only exemplary and there may be any other suitable ways for selecting the at least one intimacy based on the service type requested by the second NF.

At block 604, the first NF may determine an intimacy between the second NF and a third NF or a sub-instance of the third NF matching with the service discovery request as described above.

At block 606, the first NF may select, based on the intimacy, at least one third NF or at least one sub-instance of the third NF as described above.

At block 608, the first NF may send a service discovery response to the second NF, wherein the service discovery response comprises information of at least one third NF or at least one sub-instance of the third NF as described above.

According to various embodiments, the first NF may be a network-function repository function, the second NF may be a NF service consumer and the third NF may be a NF service provider. The NF service provider may comprise the network-function repository function. For example, the third NF may be the network-function repository function. In addition, when both the first NF and the third NF are the network-function repository function, they may form a network-function repository function swarm and be deployed in the same DC or different DCs.

Figure 7:
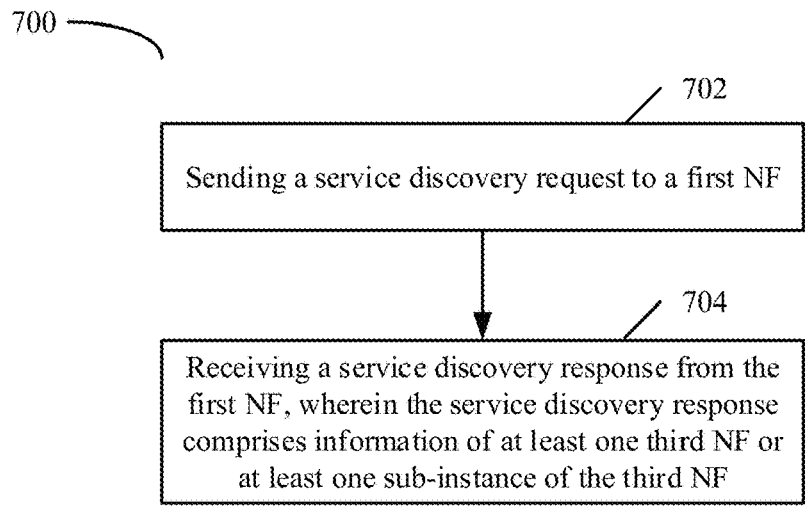
FIG. 7 illustrates a flowchart of a method implemented at a second NF according to an embodiment of the present disclosure.

FIG. 7 shows a flowchart of a method 700 according to an embodiment of the present disclosure. The method 700 may be implemented at a second NF such as NF service consumer. For some parts which have been described in the above embodiments, detailed description thereof is omitted here for brevity.

As shown in FIG. 7, the method 700 may comprise: sending a service discovery request to a first NF at block 702, wherein the service discovery request comprises intimacy information of the second NF; and receiving a service discovery response from the first NF, wherein the service discovery response comprises information of at least one third NF or at least one sub-instance of the third NF at block 704.

In an embodiment, the second NF may send the service discovery request to the first NF at block 702, wherein the service discovery request comprises intimacy information of the second NF. The service discovery request may comprise a NF discovery request, a NRF discovery request or any other suitable service discovery request. The service discovery request may be triggered in various ways as described above. The address of the first NF may be preconfigured or can be discovered though domain name system (DNS) query or can be discovered by way of the method of the present disclosure which will be described in detailed below.

The intimacy information of the second NF may comprise any suitable information that can be used to determine the intimacy between the second NF and another entity such as another NF or NRF. In an embodiment, the intimacy information may comprise at least one of data center information; geography location information; network topology information; network identity information; radio access technology capability; sub-network type; NF type; NF service type; subscriber information; quality of service information; network slice or DECOR information; and a designated indicator assigned by an operator as described above.

At block 704, the second NF may receive a service discovery response from the first NF, wherein the service discovery response comprises information of at least one third NF or at least one sub-instance of the third NF. For example, the first NF may perform the operations as described with reference to FIGS. 5-6 and send the service discovery response to the second NF. Then the second NF may receive the service discovery response and select one of the at least one third NF or at least one sub-instance of the third NF as a target NF for example according to a preconfigured or local rule.

Figure 8:
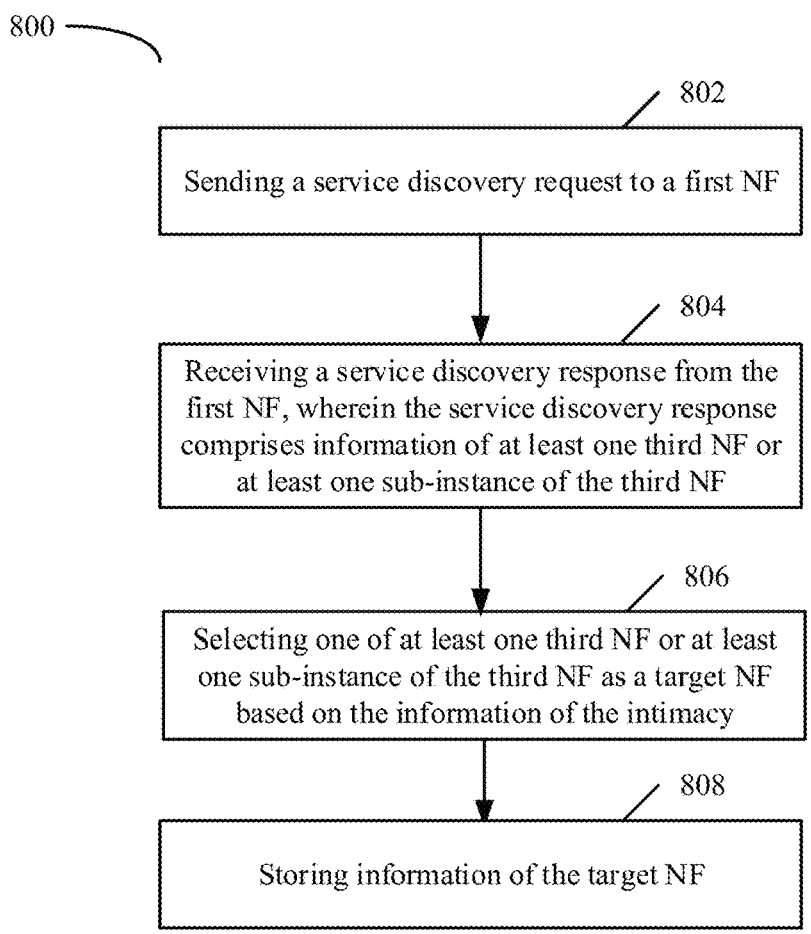
FIG. 8 illustrates a flowchart of a method implemented at a second NF according to another embodiment of the present disclosure.

FIG. 8 shows a flowchart of a method 800 according to an embodiment of the present disclosure. The method 800 may be implemented at a second NF such as NF service consumer. For some parts which have been described in the above embodiments, detailed description thereof is omitted here for brevity.

As shown in FIG. 8, the method 800 may comprise: sending a service discovery request to a first NF at block 802, wherein the service discovery request comprises intimacy information of the second NF; receiving a service discovery response from the first NF, wherein the service discovery response comprises information of at least one third NF or at least one sub-instance of the third NF at block 804; selecting one of at least one third NF or at least one sub-instance of the third NF as a target NF based on the information of the intimacy at block 806; and storing information of the target NF at block 808. The blocks 802 and 804 are similar to blocks 702 and 704 of FIG. 7, detailed description thereof is omitted here for brevity.

In an embodiment, the service discovery response may comprise information of the intimacy between the second NF and the at least one third NF or the at least one sub-instance of the third NF. Then the second NF may select one of at least one third NF or at least one sub-instance of the third NF as a target NF based on the information of the intimacy at block 806. For example, the second NF may select the third NF or the sub-instance of the third NF with the highest intimacy.

At block 808, the second NF may store information of the target NF. For example, the second NF may cache the address such as IP address of the target NF. Then the second NF may send a service request related with the target NF to the target NF.

According to various embodiments, the first NF may be a network-function repository function, the second NF may be a NF service consumer and the third NF may be a NF service provider. The NF service provider may comprise the network-function repository function. For example, the third NF may be the network-function repository function. In addition, when both the first NF and the third NF are the network-function repository function, they may form a network-function repository function swarm and be deployed in the same DC or different DCs.

FIG. 9 shows a flowchart of a method 900 according to an embodiment of the present disclosure. The method 900 may be implemented at a third NF or a sub-instance of the third NF such as NF service provider. For some parts which have been described in the above embodiments, detailed description thereof is omitted here for brevity.

As shown in FIG. 9, the method 900 may comprise: sending intimacy information of a third NF or a sub-instance of the third NF to a first NF at block 902.

In an embodiment, the third NF or the sub-instance of the third NF may send a service request such as a registration request to the first NF which may comprise its intimacy information. Alternatively, the third NF or the sub-instance of the third NF may send directly its intimacy information to the first NF. The intimacy information of the third NF or the sub-instance of the third NF may be similar to that of the second NF as described above.

In an embodiment, the intimacy information may comprise at least one of data center information; geography location information; network topology information; network identity information; radio access technology capability; sub-network type; NF type; NF service type; subscriber information; quality of service information; network slice or DECOR information; and a designated indicator assigned by an operator as described above.

According to various embodiments, the first NF may be a network-function repository function, and the third NF may be a NF service provider. The NF service provider may comprise the network-function repository function.

FIG. 10 shows a flowchart of a method 1000 according to an embodiment of the present disclosure. The method 1000 may be implemented at a NF swarm comprising a plurality of entries such as NRF swarm or NF swarm. For some parts which have been described in the above embodiments, detailed description thereof is omitted here for brevity.

As shown in FIG. 10, the method 1000 may comprise: receiving a service request from a NF, wherein the service request comprises intimacy information of the NF at block 1002; determining intimacy between the NF and the plurality of entries at block 1004; selecting, based on the intimacy, at least one entry of the NF swarm for serving the NF at block 1006; processing the service request at block 1008; and sending a service response to the NF, wherein the service response comprises information of the selected at least one entry at block 1010.

In an embodiment, at block 1002, the NF swarm may receive the service request from the NF, wherein the service request comprises intimacy information of the NF. For example, the NF swarm may comprise a plurality of entries such as sub-instances each of which may provide the function of NF or NRF. The service request may comprise a NRF/NF discovery request, NF registration request or any other suitable service request. The service request may be triggered in various ways. For example, when the NF wants to register in the network, the NF may send a NRF discovery request or NF registration request to the NF swarm such as a default entry of the NF swarm. As another example, when the NF wants to change the entry of the NF swarm, the NF may send a NRF/NF discovery request to the NF swarm.

The intimacy information of the NF may comprise any suitable information that can be used to determine the intimacy between the NF and the plurality of entries.

In an embodiment, the intimacy information may comprise at least one of data center information; geography location information; network topology information; network identity information; radio access technology capability; sub-network type; NF type; NF service type; subscriber information; quality of service information; network slice or DECOR information; and a designated indicator assigned by an operator. The intimacy information may be similar to that of the second NF as described above.

At block 1004, the NF swarm may determine intimacy between the requesting NF and the plurality of entries. For example, the intimacy information of the plurality of entries may be stored in the default entry receiving the service request or can be retrieved by the default entry. For example, the plurality of entries may send their intimacy information to the default entry. In another example, when the intimacy information of the plurality of entries is stored in a storage device, the default entry may retrieve it from the storage device. The intimacy information of the plurality of entries may be similar to that of the second NF as described above.

For example, if the intimacy information of the NF comprises data center information and the NF and an entry of the NF swarm are located in the same data center, then they may have a high intimacy, otherwise they may have a low intimacy. If the intimacy information of the NF comprises the NF service type and the entry of the NF swarm can support the NF service type, then they may have a high intimacy, otherwise they may have a low intimacy. If the intimacy information of the NF comprises the geography location information and the NF and the entry of the NF swarm are located in the same geography area, then they may have a high intimacy, otherwise they may have a low intimacy. If the intimacy information of the NF comprises the network topology information and the entry of the NF swarm is close to the NF in terms of network topology, then they may have a high intimacy.

The intimacy between the NF and the plurality of entries may be determined in various ways. In an embodiment, the intimacy may be determined by physical distance closeness between the NF and the plurality of entries. For example, if the NF and the entry of the NF swarm are located in the same geography area or neighboring different geography areas, then they may have a high intimacy, otherwise they may have a low intimacy.

In another embodiment, the intimacy may be determined by topology closeness between the NF and the plurality of entries. For example, if the NF and the entry of the NF swarm are near each other in terms of network topology, then they may have a high intimacy, otherwise they may have a low intimacy.

In another embodiment, the intimacy may be determined by a match of one or more of the intimacy information between the NF and the plurality of entries. For example, if the sub-network type is comprised in the intimacy information of the NF and the entry of the NF swarm belongs to this sub-network type, then they may have a high intimacy, otherwise they may have a low intimacy. The similar operation for determining the intimacy may be applied to other intimacy information.

In another embodiment, the intimacy may be determined by running status of the plurality of entries, such as latency, load status, O&M status. For example, the entry of the NF swarm with a lower load may have a high intimacy. As another example, if the entry of the NF swarm is being or planned to be maintained/upgraded, then it may have a low intimacy.

In addition, when two or more intimacy information are comprised in the service request, the intimacy between the NF and the plurality of entries may be a combination (such as linear) of intimacy for example as below $$F(y_n) = \sum_{n=1}^{p} a_n y_n$$

where $y_n$ denotes the intimacy between the NF and the entry of the NF swarm for the $n_{th}$ intimacy information, and $a_n$ denotes a weight which may be predefined or determined by machine learning. In addition, the intimacy may take any other suitable form in other embodiments.

Then the NF swarm such as the default entry may select, based on the intimacy, at least one entry of the NF swarm for serving the NF at block 1006. For example, the NF swarm may select top N entries with the highest intimacy, where N may be an integer and predefined or specified by the NF in the service request.

The NF swarm such as the default entry may process the service request at block 1008. The default entry may perform a corresponding operation depending on the type of the service request. For example, if the service request is a registration request, then the default entry may perform the operation related to the registration request, such as storing the NF profile of NF and marking the NF available, etc. It is noted that the processing operation may be performed at any suitable point such as before block 1004 though it is shown as at block 1008.

Then at block 1010, the NF swarm may send a service response to the NF, wherein the service response comprises information of the selected at least one entry. In an embodiment, the service response may comprise information of the intimacy between the NF and the at least one entry. The intimacy may be used by the NF to select one of the at least one entry as a target entry.

Figure 11:
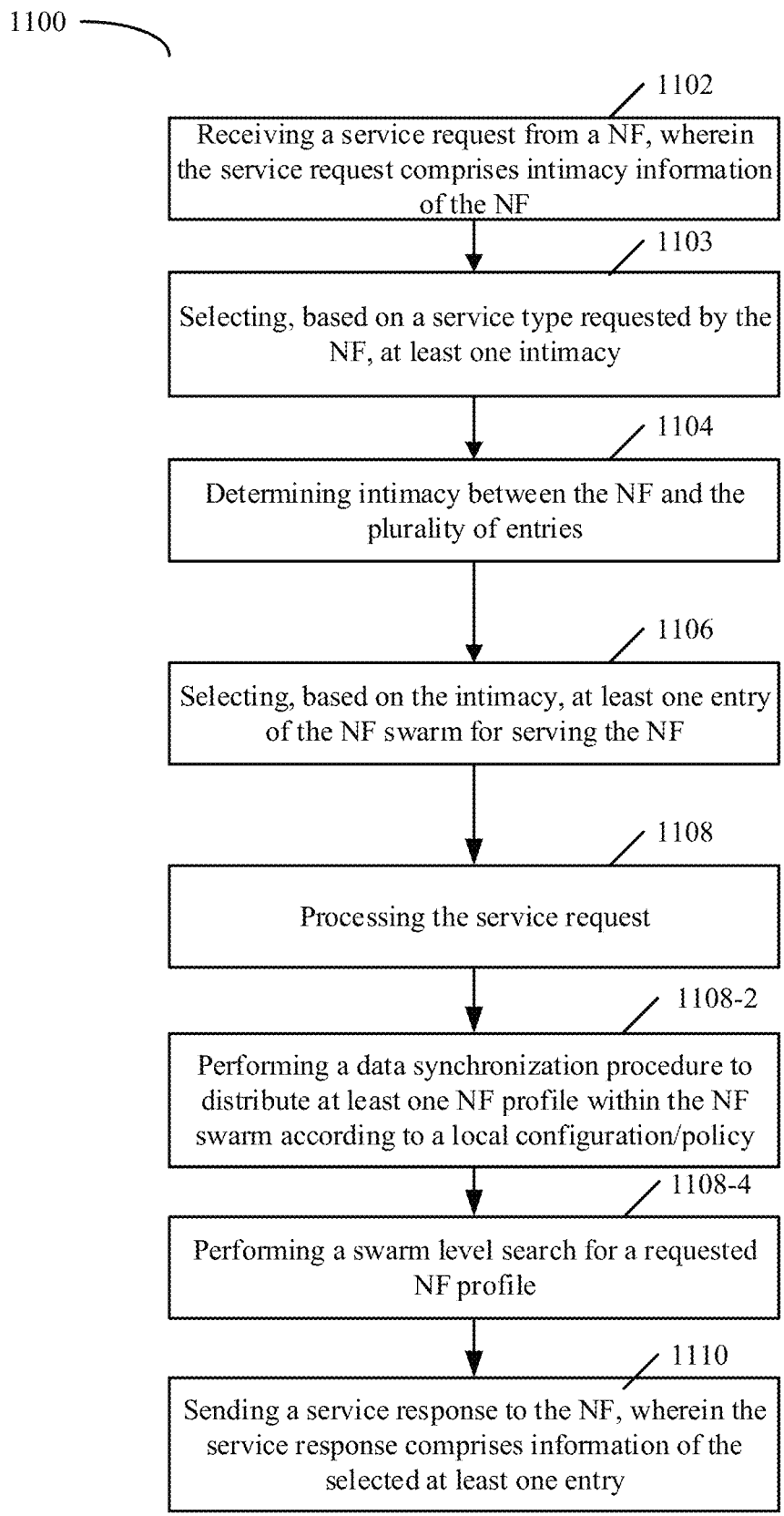
FIG. 11 illustrates a flowchart of a method implemented at a NF swarm according to another embodiment of the present disclosure.

In an embodiment, before determining an intimacy between the NF and the plurality of entries, the NF swarm such as the default entry may select, based on a service type requested by the NF, at least one intimacy at block 1103 of FIG. 11. The blocks 1102, 1104, 1106, 1108 and 1110 are similar to blocks 1002, 1004, 1006, 1008 and 1010 of FIG. 10, detailed description thereof is omitted here for brevity.

For example, if the service is a delay sensitive service, then the NF swarm may use physical distance closeness, topology closeness and/or the running status as the intimacy. As another example, if the service is a video service, then the NF swarm may use the running status as the intimacy, i.e., the first NF may select the third NF(s) with lower load. It is noted that the above examples are only exemplary and there may be any other suitable ways for selecting the at least one intimacy based on the service type requested by the NF.

In an embodiment, the NF swarm may perform a data synchronization procedure to distribute at least one NF profile within the NF swarm according to a local configuration/policy at block 1108-2. For example, when the service request is a NF registration request, the NF swarm may store the NF's profile and distribute the NF profile within the NF swarm according to the local configuration/policy.

In an embodiment, the NF swarm such as the default entry may perform a swarm level search for a requested NF profile at block 1108-4. For example, when the service request is a NF/NRF discovery request, the NF swarm may perform a swarm level search for a requested NF/NRF profile. Note that in case the swarm level search is triggered, it could be the swarm entry received the service request sends the service response back to the NF or another swarm entry returns the service response.

According to various embodiments, the NF is a NF consumer such as NF repository function service consumer and the NF swarm is a NF provider such as NF repository function swarm.

Figure 14:
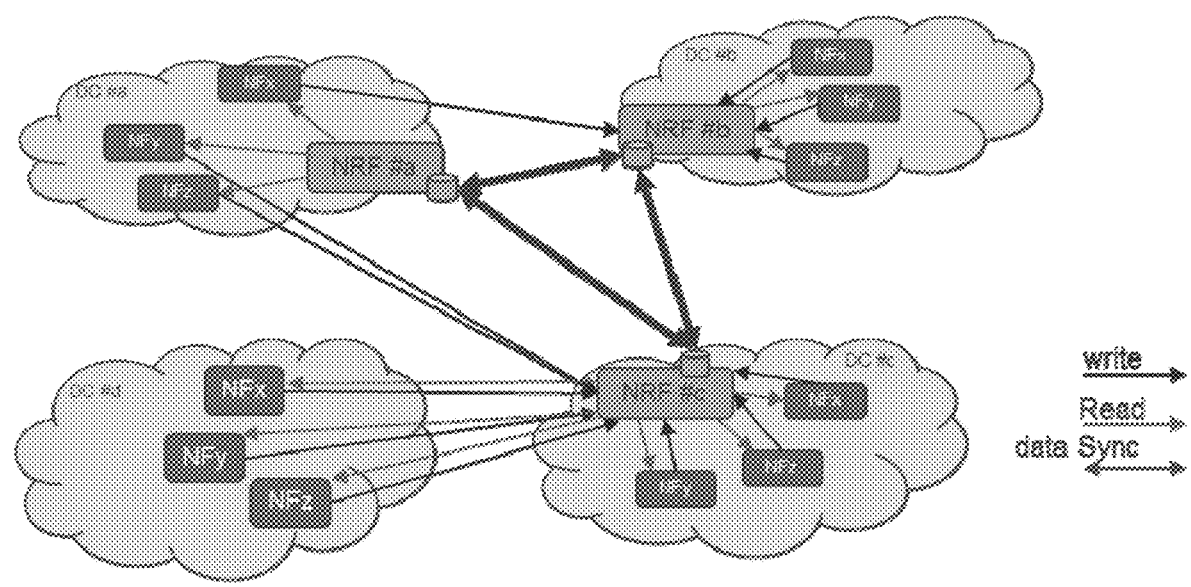
FIG. 14 illustrates a schematic deployment of the NF swarm according to an embodiment of the present disclosure.

According to various embodiments, the NF swarm may be deployed in a plurality of data centers. FIG. 14 shows a schematic deployment of the NF swarm according to an embodiment of the present disclosure. As shown in FIG. 14, the NF swarm is a NRF swarm, NRF #a is deployed in data center (DC) #a, NRF #b is deployed in data center (DC) #b, and NRF #c is deployed in data center (DC) #c.

Figure 12:
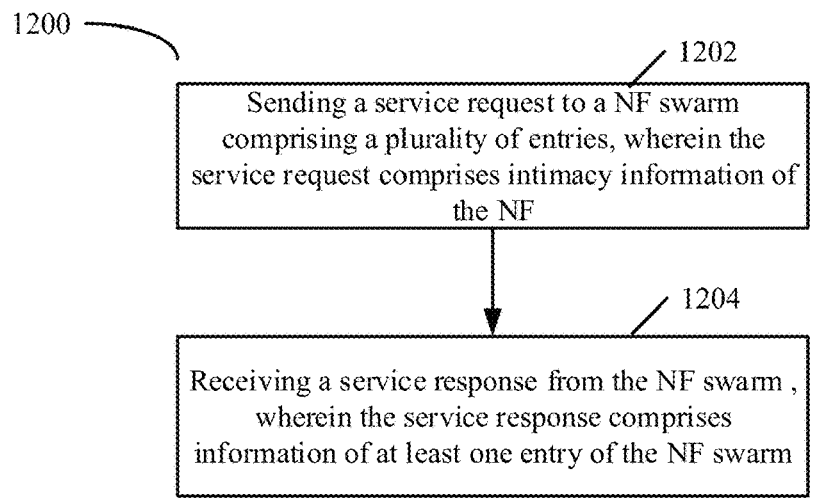
FIG. 12 illustrates a flowchart of a method implemented at a NF according to an embodiment of the present disclosure.

FIG. 12 shows a flowchart of a method 1200 according to an embodiment of the present disclosure. The method 1200 may be implemented at a NF such as NF service provider or consumer. For some parts which have been described in the above embodiments, detailed description thereof is omitted here for brevity.

As shown in FIG. 12, the method 1200 may comprise: sending a service request to a NF swarm comprising a plurality of entries at block 1202, wherein the service request comprises intimacy information of the NF; and receiving a service response from the NF swarm at block 1204, wherein the service response comprises information of at least one entry of the NF swarm.

In an embodiment, the service request may comprise a NF registration request, a NF discovery request, a NRF discovery request or any other suitable service request. The service request may be triggered in various ways as described above. The intimacy information of the NF may comprise any suitable information that can be used to determine the intimacy between the NF and the plurality of entries.

In an embodiment, the intimacy information may comprise at least one of data center information; geography location information; network topology information; network identity information; radio access technology capability; sub-network type; NF type; NF service type; subscriber information; quality of service information; network slice or DECOR information; and a designated indicator assigned by an operator. The intimacy information may be similar to that of the second NF as described above.

At block 1204, the NF may receive a service response from the NF swarm, wherein the service response comprises information of at least one entry of the NF swarm. For example, the NF swarm may perform the operations as described with reference to FIGS. 10-11 and send the service response to the NF. Then the NF may receive the service response and select one of the at least one entry as a target NF for example according to a local configuration or policy.

Figure 13:
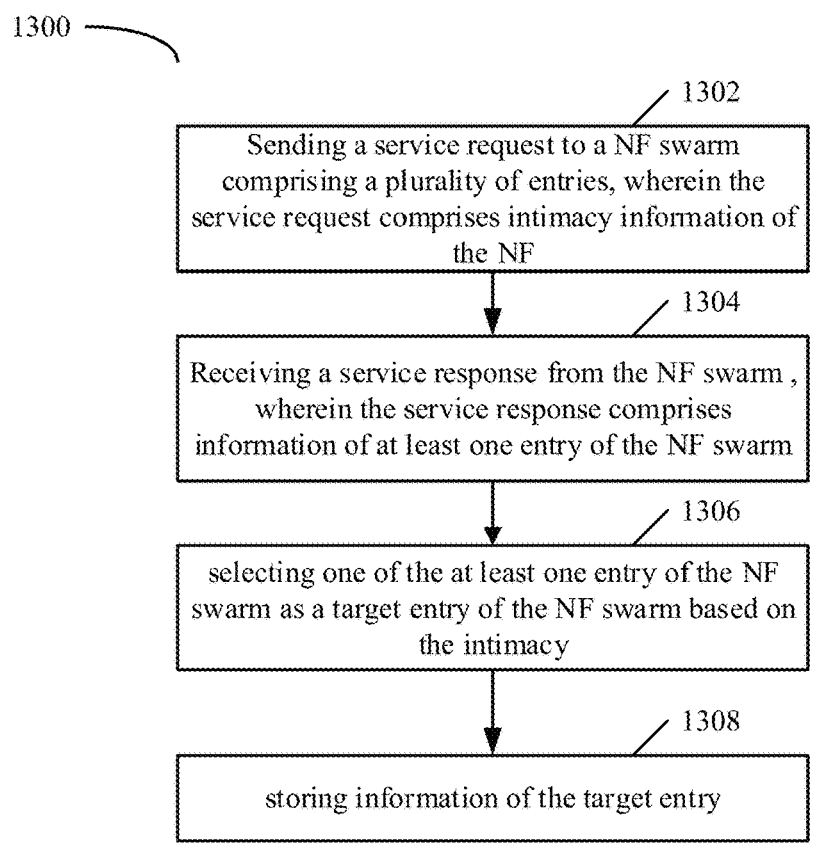
FIG. 13 illustrates a flowchart of a method implemented at a NF according to another embodiment of the present disclosure.

FIG. 13 shows a flowchart of a method 1300 according to an embodiment of the present disclosure. The method 1300 may be implemented at a NF such as NF service provider or consumer. For some parts which have been described in the above embodiments, detailed description thereof is omitted here for brevity.

As shown in FIG. 13, the method 1300 may comprise: sending a service request to a NF swarm comprising a plurality of entries at block 1302, wherein the service request comprises intimacy information of the NF; receiving a service response from the NF swarm at block 1304, wherein the service response comprises information of at least one entry of the NF swarm; selecting one of the at least one entry of the NF swarm as a target entry of the NF swarm based on the intimacy at block 1306; and storing information of the target entry at block 1308. The blocks 1302 and 1304 are similar to blocks 1202 and 1204 of FIG. 12, detailed description thereof is omitted here for brevity.

In an embodiment, the service response comprises information of the intimacy between the NF and the at least one entry. The NF may select one of the at least one entry of the NF swarm as a target entry of the NF swarm based on the intimacy at block 1306. For example, the NF may select the entry with the highest intimacy.

At block 1308, the NF may store information of the target entry. For example, the NF may cache the address such as IP address of the target entry. Then the NF may send a service request related with the target entry to the target entry.

In an embodiment, the NF is a NF repository function service consumer and the NF swarm is a NF repository function swarm.

According to various embodiments, the NF swarm may be deployed in a plurality of data centers as described above.

Figure 15:
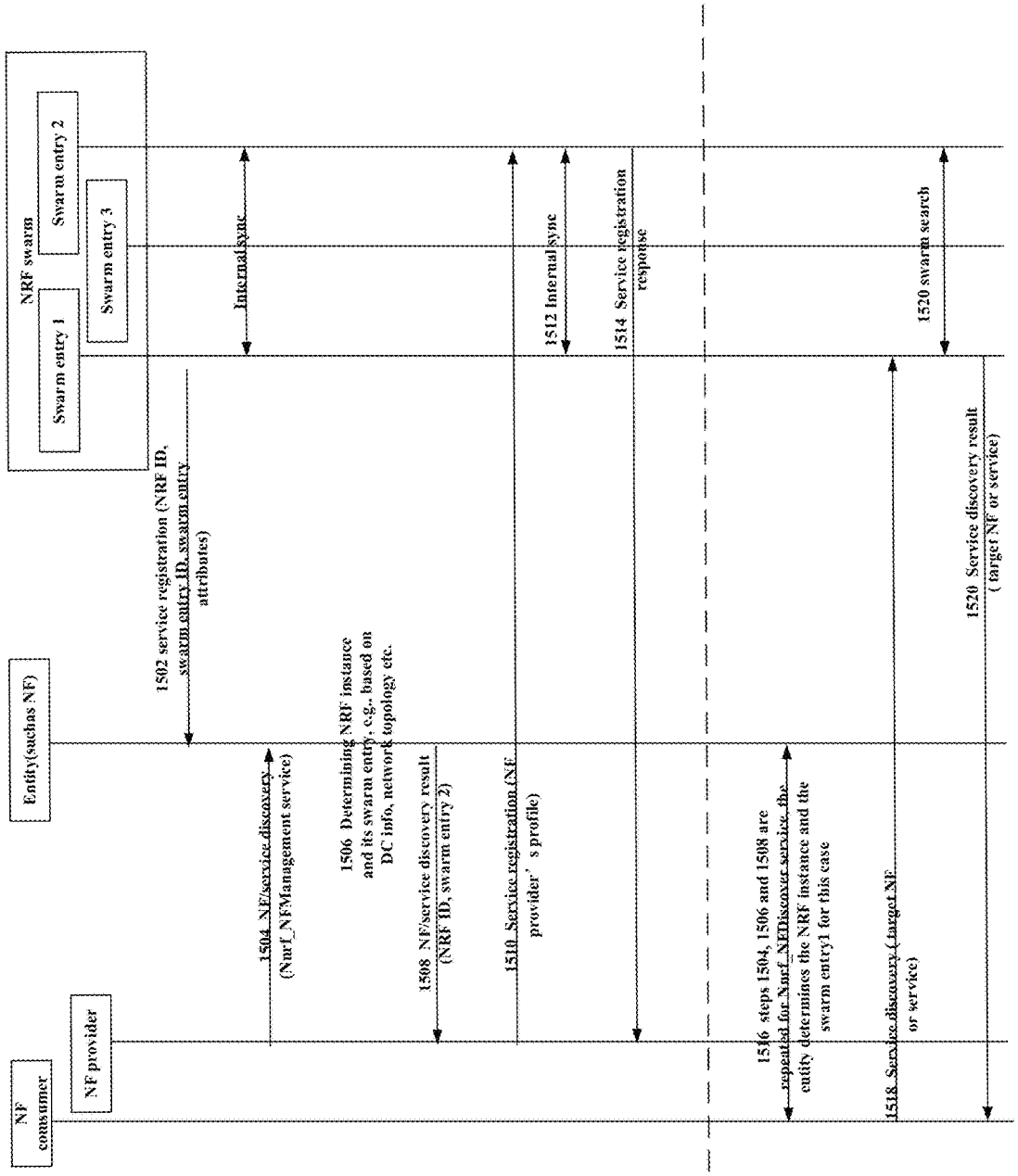
FIG. 15 illustrates a flowchart of a method according to an embodiment of the present disclosure.

FIG. 15 shows a flowchart of a method 1500 according to an embodiment of the present disclosure. For some parts which have been described in the above embodiments, detailed description thereof is omitted here for brevity.

As shown in FIG. 15, an entity such as another NF may help a NF such as NF provider to explicitly discover a NRF swarm and a relevant entry point that serves the NF in optimal way. The NF can discover the service entry for "Nnrf_NFManagement" and "Nnrf_NFDiscover" independently. A swarm entry depicted in the FIG. 15 may be understood as a subset instance within the NRF swarm, e.g. it can be a service instance for "Nnrf_NFManagement" or "Nnrf_NFDiscover" or a service set of "Nnrf_NFManagement" and "Nnrf_NFDiscover".

At 1502, the NRF swarm may register its NF profile in the entity thus it can be discovered and utilized by the NF. In addition to the NF profile capability mentioned in 3GPP TS 23.502, the NRF swarm may also register one or more swarm entries and the attributes such as intimacy information adhered to swarm entries within the NF profile. The swarm entry attributes may help the entity to determine the intimacy between the requesting NF and NRF swarm entries thus determine the best suitable swarm entries for that requesting NF. The entity then stores the NF profile from service registration procedure.

At 1504, the NF provider triggers a service discovery request to the entity to discover an NRF instance that provides Nnrf_NFManagement service, wherein the service discovery request comprises intimacy information of the NF. The NF provider may learn the location of the entity via configuration, DNS query or by knowledge from other NFs, etc.

At 1506, the entity determines, based on a local configuration or an operator policy, that the NRF instance and its swarm entry serving this requesting NF. For example, the decision may be based on the intimacy information received from requesting NF and the candidate NRFs' NF profile and swarm entry information. The entity may determine and choose at least one NRF instance and swarm entry, based on physical distance closeness and/or topology closeness, e.g. whether or not the requesting NF and the NRF/swarm entry candidates are deployed in the same DC, cluster, domain etc.; match of one or more of the mentioned attributes above, e.g. whether or not the requesting NF is within the supported NF type list of the candidate NRF/swarm entries; running status of the swarm entry, e.g. latency, load status, O&M status.

At 1508, the entity then returns the selected at least one NRF instances and/or swarm entries back to the requesting NF, optionally within a list of priority.

The requesting NF may store the list of NRF instances and/or swarm entries. Optionally the NF may also subscribe from entity about event on change of profiles of NRF instances and/or swarm entries to adjust.

Note that the mentioned steps 1502-1508 not only apply for discovering an NRF, but also applies for other type of NF, e.g. to determine a NF instance based on the mentioned attributes above for a service discovery request.

At 1510, the NF provider then sends a service registration request for example via Nnrf_NFManagement service towards the selected NRF instance and swarm entry, as per the procedure defined in 3GPP TS 23.502.

Note that in case of the NRF instances and swarm entries are returned in block 1508, the NF provider may perform similar selection as mentioned in block 1506, in addition to its local selection logic/policy.

At 1512, the NRF swarm entry receives the service registration request and stores the NF profile as per 3GPP 23.502, the disclosure of which is incorporated by reference herein in its entirety. Additionally, the NRF swarm may trigger a data synchronization procedure to distribute the NF profiles within the swarm according its local configuration/policy at 1512. Then at 1514, the NRF swarm entry may send a service registration response to the NF.

As for the procedure for a NF consumer to trigger a service discovery request for example via Nnrf_NFDiscover service is as below.

At 1516, the steps 1504, 1506 and 1508 above are repeated here. The entity then returns the selected one or more NRF instances and/or swarm entries back to the requesting NF.

At 1518, the NF consumer then sends the service discovery request for example via Nnrf_NFDiscover service towards the selected NRF instance and swarm entry, as per the procedure defined in 3GPP TS 23.502.

At 1520, the NRF swarm entry receives the service discovery request and then discover the requested NF profile as per 3GPP 23.502. Additionally, NRF swarm may trigger a swarm level search for the requested NF profile.

At 1522, the NRF swarm then returns the selected one or more NF/service instances back to the requesting NF as per 3GPP 23.502.

Note that in case swarm search is triggered, it could be the swarm entry received the request sends the service discovery result back to the NF consumer or another swarm entry returns the result.

Figure 16:
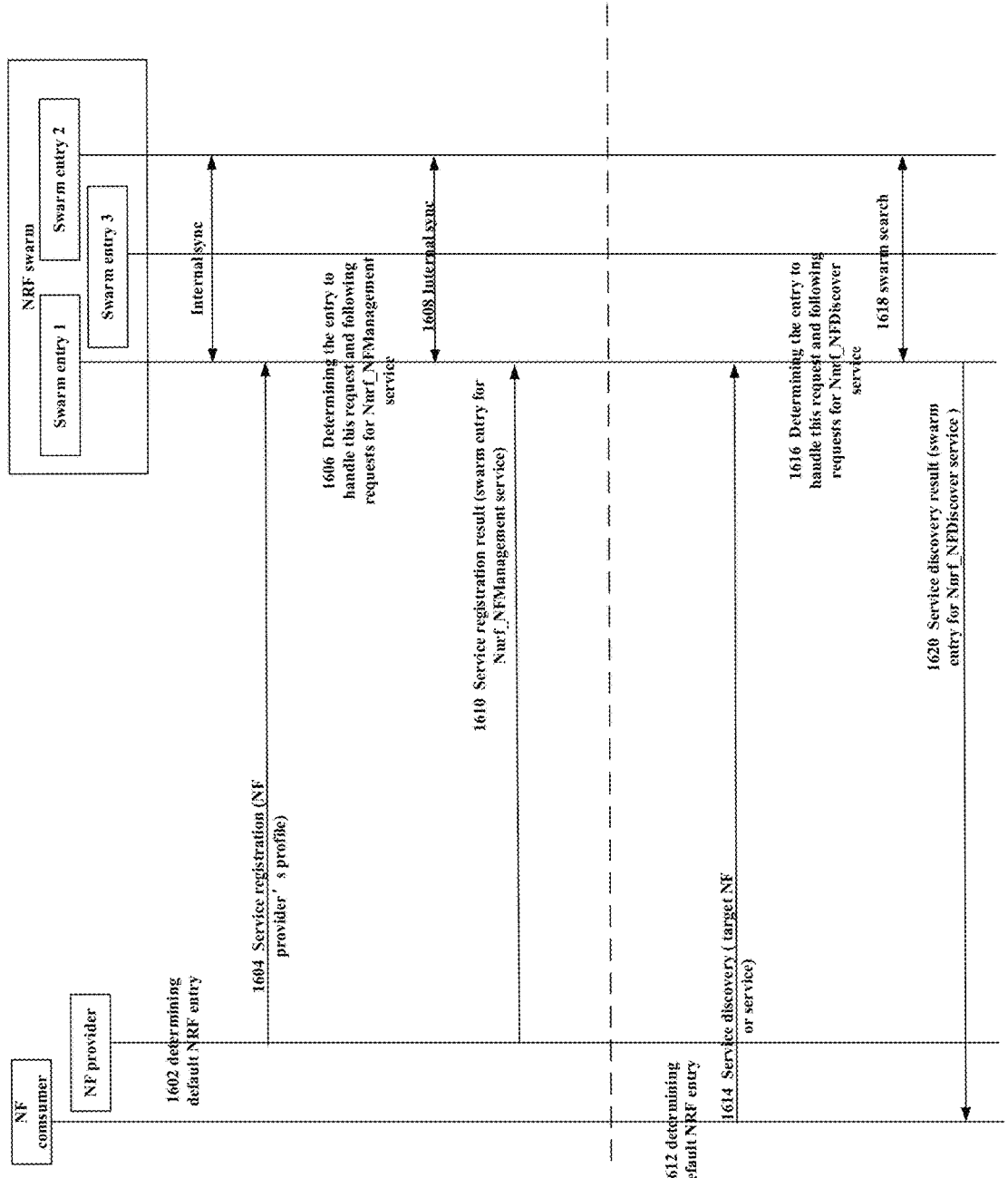
FIG. 16 illustrates a flowchart of a method according to another embodiment of the present disclosure.

FIG. 16 shows a flowchart of a method 1600 according to an embodiment of the present disclosure. For some parts which have been described in the above embodiments, detailed description thereof is omitted here for brevity. In this embodiment, the NF can implicitly discover a NRF swarm entry.

At 1602, a NF provider determines a default NRF (swarm) instance that will be used for registration service. For example, the NF provider may determine the default NRF (swarm) instance via configuration, DNS query, or by knowledge from another NF etc.

At 1604, the NF provider then sends a service registration request for example via Nnrf_NFManagement service towards the determined NRF instance, as per the procedure defined in 3GPP TS 23.502, wherein the service registration request comprises intimacy information of the NF provider.

At 1606, the NRF swarm, based on an intimacy between the NF provider and a swarm entry, determines which swarm entry serving this requesting NF. The decision may be based on the intimacy information received from requesting NF and the capability of the NRF's swarm entries. For example, the NRF may choose a swarm instance, based on:

Physical distance closeness or topology closeness according to the mentioned attributes above, e.g. whether or not requesting NF and the swarm entry candidate are deployed in the same DC, cluster, domain etc.

Match of one or several of the mentioned attributes above, e.g. whether or not the requesting NF is within the supported NF type list of the candidate swarm entry The selected NRF swarm entry then handles the service registration request and stores the NF profile as per 3GPP 23.502.

At 1608, the NRF swarm may trigger a data synchronization procedure to distribute the NF profile within the swarm according its local configuration/policy.

At 1610, the NRF swarm then send back the service registration result back to the requesting NF. Additionally in the return result, it may include also information of at least one NRF swarm entry, which can be used for next time Nnrf_NFManagement service.

Note that it could be the (default) swarm entry received the request sends service registration result back to the NF provider or another swarm entry returns the result.

The procedure for a NF consumer to trigger a service discovery request for example via Nnrf_NFDiscover service is as below.

At 1612, a NF consumer determines a default NRF (swarm) instance that will be used for the service discovery service.

At 1614, the NF consumer then sends the service discovery request for example via Nnrf_NFDiscover service towards the selected NRF instance, as per the procedure defined in 3GPP TS 23.502, wherein the service discovery request comprises intimacy information of the NF consumer.

At 1616, the NRF swarm, based on an intimacy between the NF consumer and a swarm entry, determines which swarm entry serving this requesting NF. The similar decision process may be used as in step 1606 above. The selected NRF swarm entry then handle the service discovery request and stores the NF profile as per 3GPP 23.502.

At 1618, the NRF swarm may trigger a swarm level search for the requested NF profile.

At 1620, the NRF swarm then sends back the service discovery result back to the requesting NF. Additionally in the return result, it may include also the NRF swarm entry information, which can be used for next time Nnrf_NFDiscover service, back to the requesting NF.

Note that in case swarm search is triggered, it could be the swarm entry received the request sends the service discovery result back to NF consumer or another swarm entry returns the result.

Figure 17A:
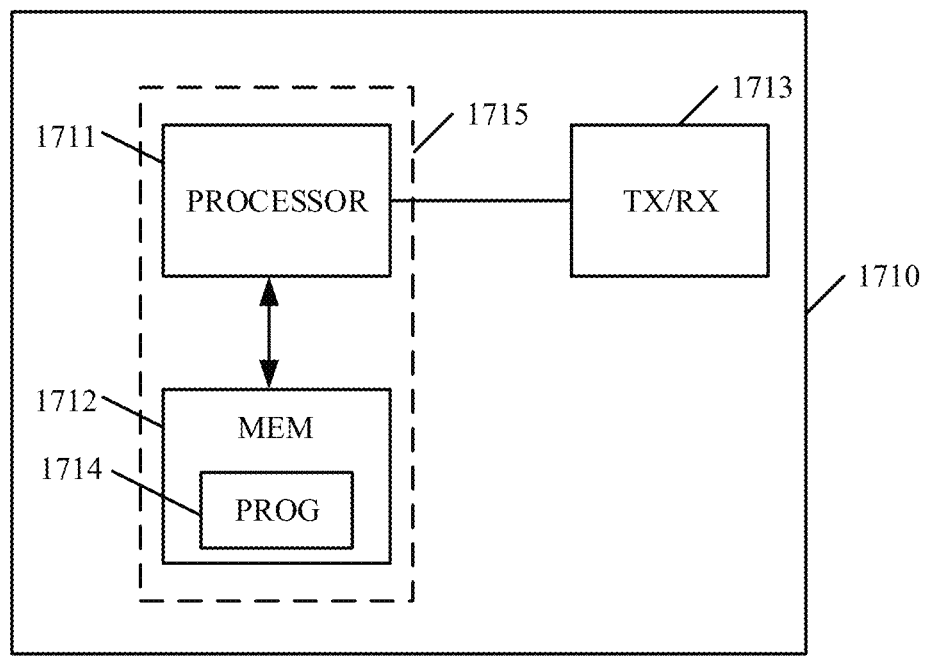
FIGS. 17a-17e illustrate simplified block diagrams of an apparatus in a first NF, a second NF, a third NF, a NF swarm and a NF, respectively, according to an embodiment of the present disclosure.
Figure 17B:
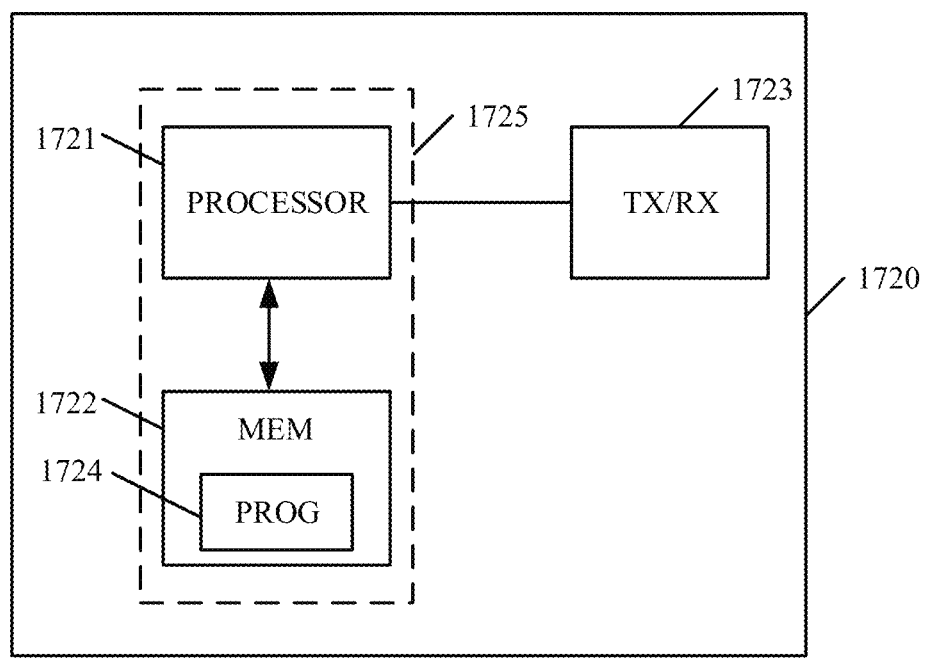
Figure 17C:
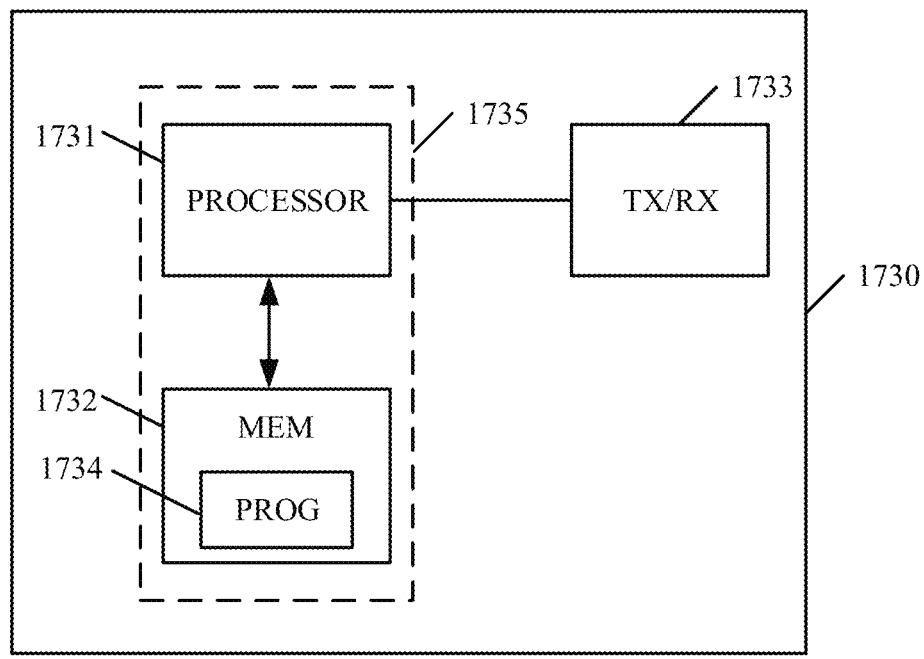
Figure 17D:
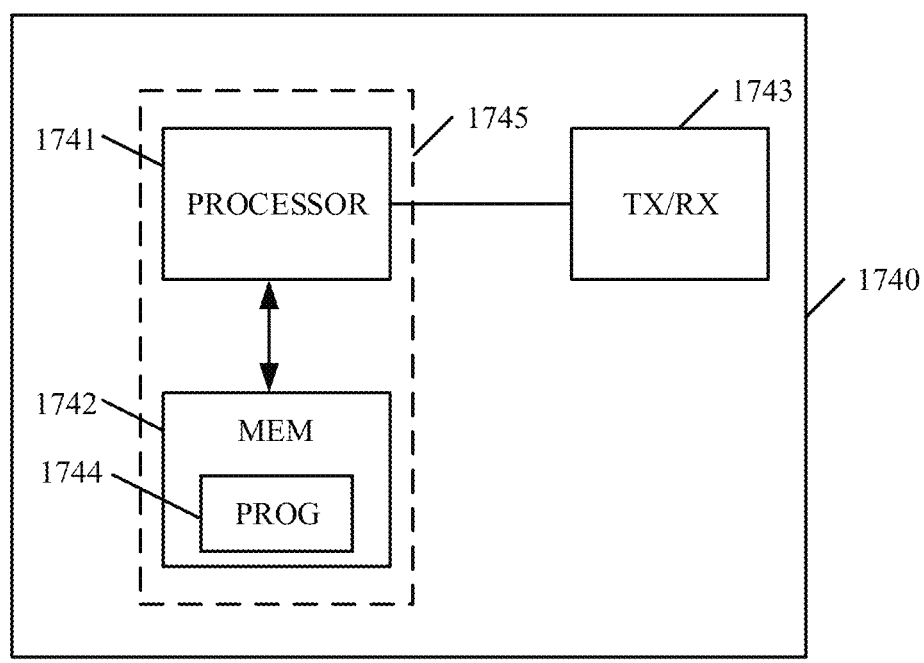
Figure 17E:
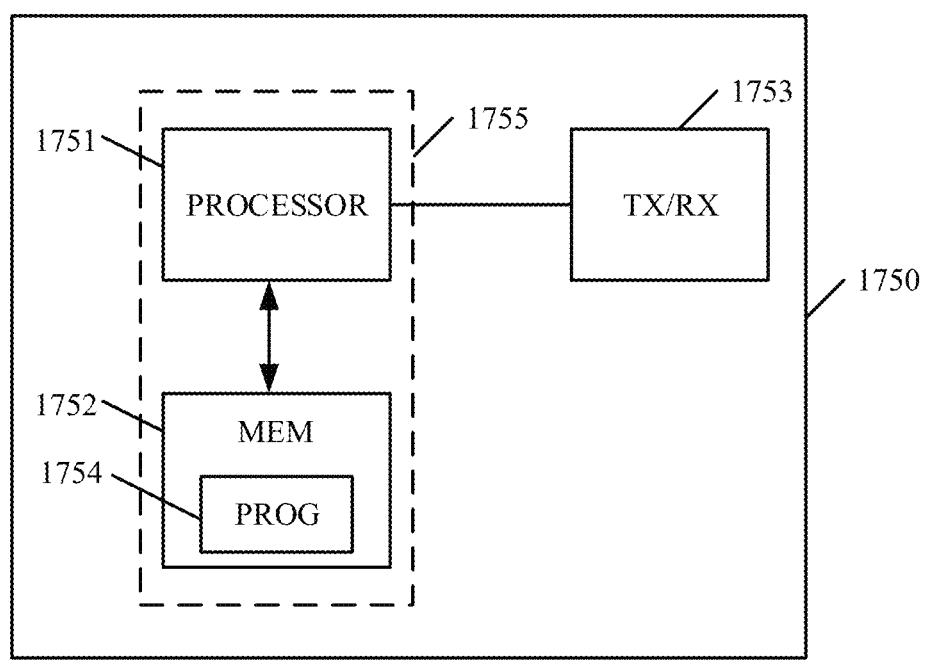

FIG. 17a illustrates a simplified block diagram of an apparatus 1710 that may be embodied in/as a first NF in a network according to an embodiment of the present disclosure. FIG. 17b illustrates an apparatus 1720 that may be embodied in/as a second NF according to an embodiment of the present disclosure. FIG. 17c shows an apparatus 1730 that may be embodied in/as a third NF according to an embodiment of the present disclosure. FIG. 17d shows an apparatus 1740 that may be embodied in/as a NF swarm comprising a plurality of entries according to an embodiment of the present disclosure. FIG. 17e shows an apparatus 1750 that may be embodied in/as a NF according to an embodiment of the present disclosure.

The apparatus 1710 may comprise at least one processor 1711, such as a data processor (DP) and at least one memory (MEM) 1712 coupled to the processor 1711. The apparatus 1710 may further comprise a transmitter TX and receiver RX 1713 coupled to the processor 1711. The MEM 1712 stores a program (PROG) 1714. The PROG 1714 may include instructions that, when executed on the associated processor 1711, enable the apparatus 1710 to operate in accordance with the embodiments of the present disclosure, for example to perform the methods 500, 600. A combination of the at least one processor 1711 and the at least one MEM 1712 may form processing means 1715 adapted to implement various embodiments of the present disclosure.

The apparatus 1720 comprises at least one processor 1721, such as a DP, and at least one MEM 1722 coupled to the processor 1721. The apparatus 1720 may further comprise a transmitter TX and receiver RX 1723 coupled to the processor 1721. The MEM 1722 stores a PROG 1724. The PROG 1724 may include instructions that, when executed on the associated processor 1721, enable the apparatus 1720 to operate in accordance with the embodiments of the present disclosure, for example to perform the methods 700, 800. A combination of the at least one processor 1721 and the at least one MEM 1722 may form processing means 1725 adapted to implement various embodiments of the present disclosure.

The apparatus 1730 comprises at least one processor 1731, such as a DP, and at least one MEM 1732 coupled to the processor 1731. The apparatus 1730 may further comprise a transmitter TX and receiver RX 1733 coupled to the processor 1731. The MEM 1732 stores a PROG 1734. The PROG 1734 may include instructions that, when executed on the associated processor 1721, enable the apparatus 1730 to operate in accordance with the embodiments of the present disclosure, for example to perform the method 900. A combination of the at least one processor 1731 and the at least one MEM 1732 may form processing means 1735 adapted to implement various embodiments of the present disclosure.

The apparatus 1740 may comprise at least one processor 1741, such as a data processor (DP) and at least one memory (MEM) 1742 coupled to the processor 1741. The apparatus 1740 may further comprise a transmitter TX and receiver RX 1743 coupled to the processor 1741. The MEM 1742 stores a program (PROG) 1744. The PROG 1744 may include instructions that, when executed on the associated processor 1741, enable the apparatus 1740 to operate in accordance with the embodiments of the present disclosure, for example to perform the methods 1000, 1100. A combination of the at least one processor 1741 and the at least one MEM 1742 may form processing means 1745 adapted to implement various embodiments of the present disclosure.

The apparatus 1750 may comprise at least one processor 1751, such as a data processor (DP) and at least one memory (MEM) 1752 coupled to the processor 1751. The apparatus 1750 may further comprise a transmitter TX and receiver RX 1753 coupled to the processor 1751. The MEM 1752 stores a program (PROG) 1754. The PROG 1754 may include instructions that, when executed on the associated processor 1751, enable the apparatus 1750 to operate in accordance with the embodiments of the present disclosure, for example to perform the methods 1200, 1300. A combination of the at least one processor 1751 and the at least one MEM 1752 may form processing means 1755 adapted to implement various embodiments of the present disclosure.

Various embodiments of the present disclosure may be implemented by computer program executable by one or more of the processors 1711, 1721 1731, 1741 and 1751, software, firmware, hardware or in a combination thereof.

The MEMs 1712, 1722, 1732, 1742 and 1752 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1711, 1721 1731, 1741 and 1751 may be of any type suitable to the local technical environment, and may include one or more of general purpose computers, special purpose computers, microprocessors, digital signal processors DSPs and processors based on multicore processor architecture, as non-limiting examples.

Figure 18:
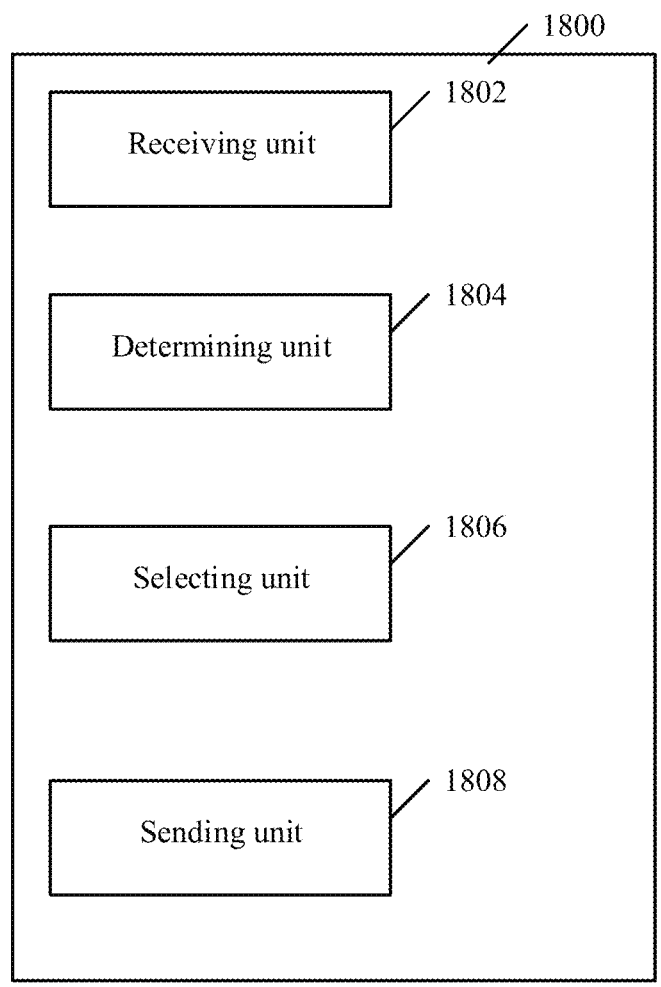
FIG. 18 illustrates a simplified block diagram of an apparatus for a first NF according to an embodiment of the present disclosure.

Reference is now made to FIG. 18, which illustrates a schematic block diagram of an apparatus 1800 for a first NF in a network. The apparatus 1800 is operable to carry out the exemplary methods 500, 600 described with reference to FIGS. 5-6 and possibly any other processes or methods.

As shown in FIG. 18, the apparatus 1800 may comprise: a receiving unit 1802 configured to receive a service discovery request from a second NF, wherein the service discovery request comprises intimacy information of the second NF; a determining unit 1804 configured to determine intimacy between the second NF and a third NF or a sub-instance of the third NF matching with the service discovery request; a selecting unit 1806 configured to select, based on the intimacy, at least one third NF or at least one sub-instance of the third NF; and a sending unit 1808 configured to send service discovery response to the second NF, wherein the service discovery response comprises information of at least one third NF or at least one sub-instance of the third NF.

In some embodiment, the selecting unit is further configured to select, based on the service type requested by the second NF, at least one intimacy for determining the at least one third NF or at least one sub-instance of the third NF matching with the service discovery request.

In some embodiment, the receiving unit 1802 is further configured to receive intimacy information of the third NF or the sub-instance of the third NF from the third NF or the sub-instance of the third NF.

Figure 19:
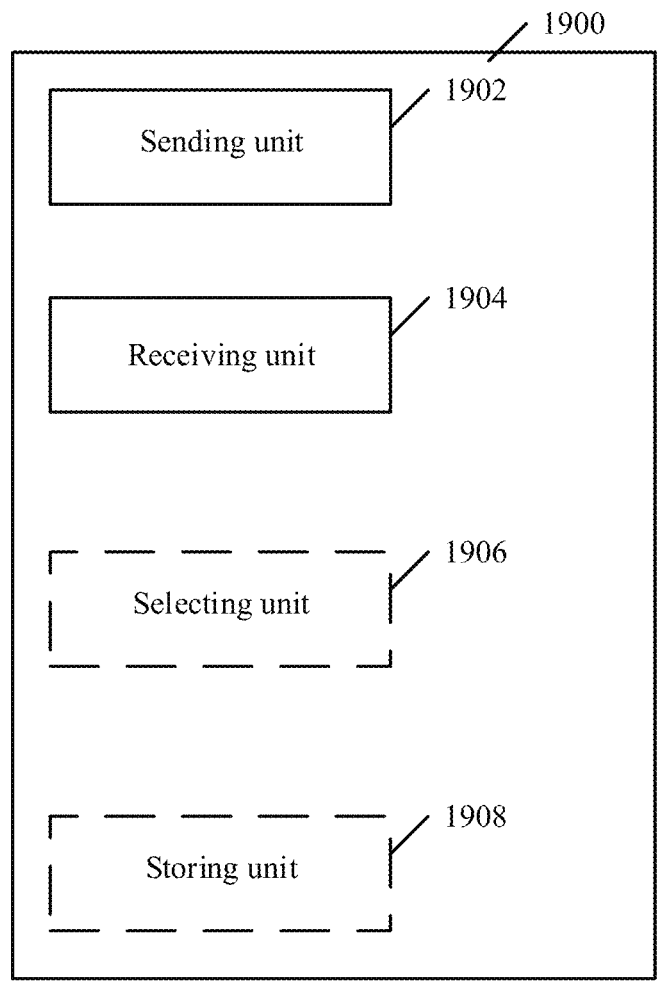
FIG. 19 illustrates a simplified block diagram of an apparatus for a second NF according to an embodiment of the present disclosure.

Reference is now made to FIG. 19, which illustrates a schematic block diagram of an apparatus 1900 for a second NF in a network. The apparatus 1900 is operable to carry out the exemplary methods 700, 800 described with reference to FIGS. 7-8 and possibly any other processes or methods.

As shown in FIG. 19, the apparatus 1900 may comprise: a sending unit 1902 configured to send a service discovery request to a first NF, wherein the service discovery request comprises intimacy information of the second NF; and a receiving unit 1904 configured to receive a service discovery response from the first NF, wherein the service discovery response comprises information of at least one third NF or at least one sub-instance of the third NF.

In some embodiments, the apparatus 1900 may comprise: a selecting unit 1906 configured to select one of at least one third NF or at least one sub-instance of the third NF as a target NF based on the information of the intimacy; and a storing unit 1908 configured to store information of the target NF.

Figure 20:
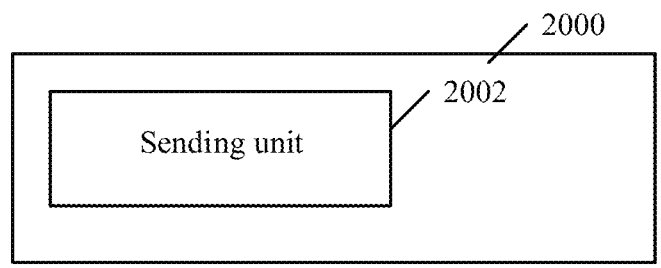
FIG. 20 illustrates a simplified block diagram of an apparatus for a third NF according to an embodiment of the present disclosure.

Reference is now made to FIG. 20, which illustrates a schematic block diagram of an apparatus 2000 for a third NF in a network. The apparatus 2000 is operable to carry out the exemplary the method 900 described with reference to FIG. 9 and possibly any other processes or methods.

As shown in FIG. 20, the apparatus 2000 may comprise: a sending unit 2002 configured to send intimacy information of the third NF or a sub-instance of the third NF to a first NF.

Figure 21:
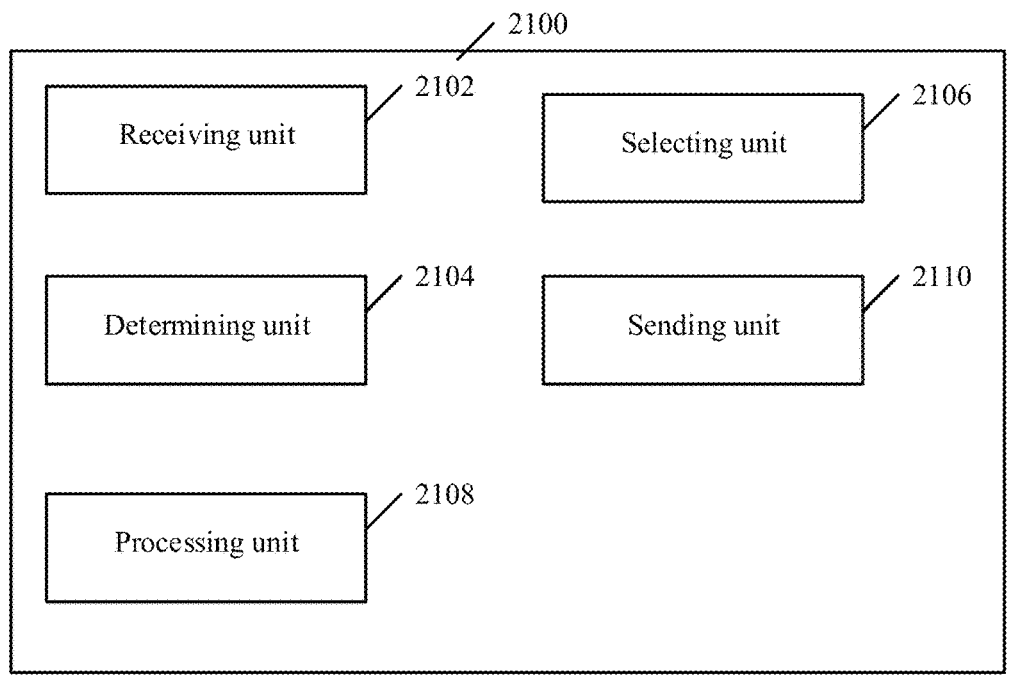
FIG. 21 illustrates a simplified block diagram of an apparatus for a NF swarm according to an embodiment of the present disclosure.

Reference is now made to FIG. 21, which illustrates a schematic block diagram of an apparatus 2100 for a NF swarm comprising a plurality of entries. The apparatus 2100 is operable to carry out the exemplary methods 1000, 1100 described with reference to FIGS. 10-11 and possibly any other processes or methods.

As shown in FIG. 21, the apparatus 2100 may comprise: a receiving unit 2102 configured to receive a service request from a NF, wherein the service request comprises intimacy information of the NF; a determining unit 2104 configured to determine intimacy between the NF and the plurality of entries; a selecting unit 2106 configured to select, based on the intimacy, at least one entry of the NF swarm for serving the NF; a processing unit 2108 configured to process the service request; and a sending unit 2110 configured to send a service response to the NF, wherein the service response comprises information of at least one entry.

In some embodiments, before determining an intimacy between the NF and the plurality of entries, the selecting unit 2106 may be further configured to select, based on the service type requested by the NF, at least one intimacy.

Figure 22:
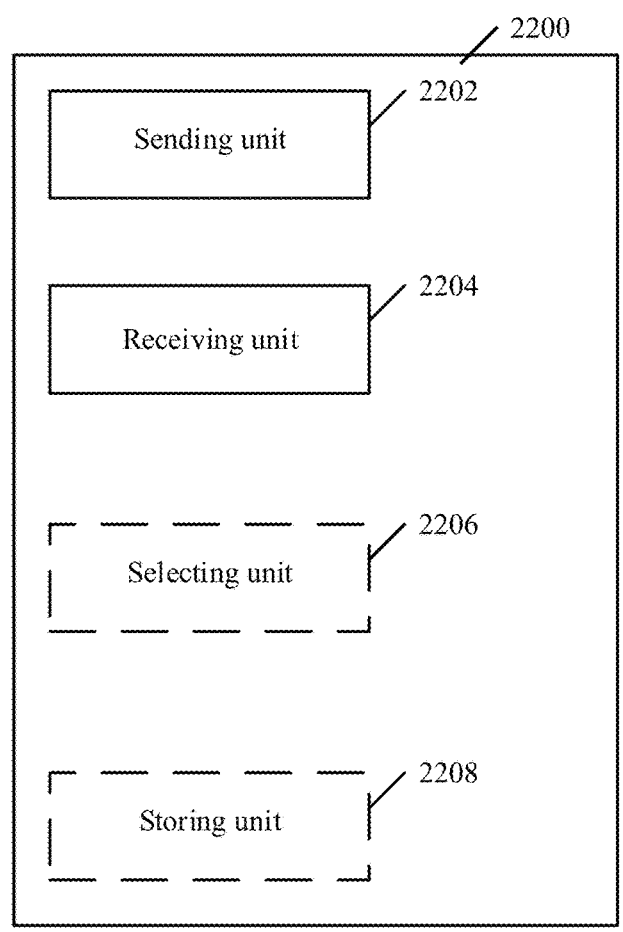
FIG. 22 illustrates a simplified block diagram of an apparatus for a NF according to an embodiment of the present disclosure.

Reference is now made to FIG. 22, which illustrates a schematic block diagram of an apparatus 2200 for a NF. The apparatus 2200 is operable to carry out the exemplary methods 1200, 1300 described with reference to FIGS. 12-13 and possibly any other processes or methods.

As shown in FIG. 22, the apparatus 2200 may comprise: a sending unit 2202 configured to sending a service request to a NF swarm comprising a plurality of entries, wherein the service request comprises intimacy information of the NF and a receiving unit 2204 configured to receive a service response from the NF swarm, wherein the service response comprises information of at least one entry of the NF swarm.

In some embodiments, the apparatus 2200 may further comprise: a selecting unit 2206 configured to select one of the at least one entry of the NF swarm as a target entry of the NF swarm based on the intimacy and a storing unit 2208 configured to store information of the target entry.

It would be appreciated that, some units or modules in the apparatus 1800, 1900, 2000, 2100 or 2200 can be combined in some implementations. For example, in one embodiment, it is possible to use a single transceiving unit to send and receive the information.

According to an aspect of the disclosure it is provided a computer program product being tangibly stored on a computer readable storage medium and including instructions which, when executed on at least one processor, cause the at least one processor to carry out the method related to the first NF as described above, such as the methods 500 and 600 and a part of methods 1500 and 1600.

According to an aspect of the disclosure it is provided a computer program product being tangibly stored on a computer readable storage medium and including instructions which, when executed on at least one processor, cause the at least one processor to carry out the method related to the second NF as described above, such as the methods 700 and 800 and a part of methods 1500 and 1600.

According to an aspect of the disclosure it is provided a computer program product being tangibly stored on a computer readable storage medium and including instructions which, when executed on at least one processor, cause the at least one processor to carry out the method related to the third NF as described above, such as the method 900 and a part of methods 1500 and 1600.

According to an aspect of the disclosure it is provided a computer program product being tangibly stored on a computer readable storage medium and including instructions which, when executed on at least one processor, cause the at least one processor to carry out the method related to the NF swarm as described above, such as the methods 1000 and 1100 and a part of methods 1500 and 1600.

According to an aspect of the disclosure it is provided a computer program product being tangibly stored on a computer readable storage medium and including instructions which, when executed on at least one processor, cause the at least one processor to carry out the method related to the NF as described above, such as the methods 1200 and 1300 and a part of methods 1500 and 1600.

Although some embodiments are described in the context of an exemplary network shown in FIG. 1, it should not be construed as limiting the spirit and scope of the present disclosure. The principle and concept of the present disclosure may be more generally applicable to other network architectures.

According to embodiments of present disclosure, the NRF service instance may be dispersedly deploy in different places, e.g. data center, domain. Thus the NF deployed in those places can make use of "local" NRF as much as possible. Thus it enables latency improvement for service discovery thus over all network signaling improvement. Optimization of "read" and "write" operation is also optimized by applying separated intimacy determination for different service to be invoked. The embodiments of present disclosure may enable 5GC NF to do service discovery always in a "local" manner regardless its deployment in view of network topology. Thus, latency may be improved. In addition, the embodiments of present disclosure may relieve effort of NF to implement application level cache effort.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. An apparatus for a first network function (NF) in a network system, comprising:
   a processor; and
   a memory coupled to the processor, said memory containing instructions executable by said processor, whereby said apparatus is operative to:
   receive a service discovery request from a second NF, wherein the service discovery request comprises intimacy information of the second NF, wherein the intimacy information of the second NF comprises data center information,
      wherein the first NF is to discover at least one third NF or at least one sub-instance of the third NF based on intimacy between the second NF and the third NF or the at least one sub-instance of the third NF, and wherein intimacy information of the at least one third NF or the at least one sub-instance of the third NF is stored in the first NF; and
   send a service discovery response to the second NF, wherein the service discovery response comprises information of the at least one third NF or at least one sub-instance of the third NF, wherein the information of the at least one third NF or at least one sub-instance of the third NF within the service discovery response is to be used by the second NF to select one of the at least one third NF or the at least one sub-instance of the third NF as a target NF.

2. The apparatus according to claim 1, wherein the first NF is a network-function repository function or a NF repository function swarm, and the second NF is a NF service consumer.

3. The apparatus according to claim 1, wherein the intimacy is based on at least one of:
   physical distance closeness between the second NF and the at least one third NF or the at least one sub-instance of the third NF;
   topology closeness between the second NF and the at least one third NF or the at least one sub-instance of the third NF; and
   match of one or more of the intimacy information between the second NF and the at least one third NF or the at least one sub-instance of the third NF.

4. An apparatus for a second network-function (NF) in a network system, comprising:
   a processor; and
   a memory coupled to the processor, said memory containing instructions executable by said processor, whereby said apparatus is operative to:
   send a service discovery request to a first NF, wherein the service discovery request comprises intimacy information of the second NF, wherein the intimacy information of the second NF comprises data center information;
   receive a service discovery response from the first NF, wherein the service discovery response comprises information of at least one third NF or at least one sub-instance of the third NF stored in the first NF, wherein the service discovery response is based on intimacy between the at least one third NF or the at least one sub-instance of the third NF and the second NF; and
   select one of the at least one third NF or the at least one sub-instance of the third NF as a target NF based on the information of at least one third NF or at least one sub-instance of the third NF in the service discovery response.

5. The apparatus according to claim 4, wherein the first NF is a network-function repository function or a NF repository function swarm, and the second NF is a NF service consumer.

6. An apparatus for a third network function (NF) in a network system, comprising:
   a processor; and
   a memory coupled to the processor, said memory containing instructions executable by said processor, whereby said apparatus is operative to:
   send intimacy information of the third NF or a sub-instance of the third NF to a first NF; and
   receive, from the first NF, a response of acknowledgement for storing of the intimacy information in the first NF, wherein the intimacy information of the third NF or the sub-instance of the third NF comprises data center information; and
      wherein the intimacy information of the third NF or the sub-instance of the third NF is to be stored in the first NF and to be utilized in a service discovery procedure in which a service discovery response is sent based on the third NF or the sub-instance of the third NF, and intimacy between a second NF, intimacy information of which is included in a service discovery request, and wherein information of the third NF or sub-instance of the third NF within the service discovery response is to be used by the second NF to select one of the third NF or the sub-instance of the third NF as a target NF.

7. The apparatus according to claim 6, wherein the intimacy information is sent via a registration request or the service discovery request, and when the intimacy information is received via a registration request, the third NF or the sub-instance of the third NF is a provider of a network service to be registered via the registration request.

8. The apparatus according to claim 6, wherein the first NF is a network-function repository function or a NF repository function swarm.

9. The apparatus according to claim 6, wherein the intimacy information of the third NF or the sub-instance of the third NF is sent via a registration request, and wherein the third NF or the sub-instance of the third NF is a provider of a network service to be registered via the registration request.

10. An apparatus for a first network-function (NF) in a network system, comprising:
a processor; and
a memory coupled to the processor, said memory containing instructions executable by said processor, whereby said apparatus is operative to:
receive intimacy information of a third NF from the third NF, or receiving intimacy information of a sub-instance of the third NF from the sub-instance of the third NF; and
store the intimacy information in the first NF;
wherein the intimacy information comprises data center information;
wherein upon receiving a service discovery request from a second NF, a service discovery response is sent to the second NF, wherein the third NF or the sub-instance of the third NF is discovered based on intimacy between the second NF and the third NF or the sub-instance of the third NF, and wherein information of the third NF or the sub-instance of the third NF in the service discovery response is to be used by the second NF to select one of the third NF or the sub-instance of the third NF as a target NF.

11. The apparatus according to claim 10, wherein the intimacy information is received via a registration request or the service discovery request, and when the intimacy information is received via a registration request, the third NF or the sub-instance of the third NF is a provider of a network service to be registered via the registration request.

12. The apparatus according to claim 10, wherein the first NF is a network-function repository function or a NF repository function swarm.

13. A non-transitory computer readable storage medium containing instructions, which when executed by a processor, are capable of performing: receiving, at a first network function (NF) in a network system, a service discovery request from a second NF, wherein the service discovery request comprises intimacy information of the second NF, wherein the intimacy information of the second NF comprises data center information, wherein the first NF is to discover at least one third NF or at least one sub-instance of the third NF based on intimacy between the second NF and the third NF or the at least one sub-instance of the third NF, and wherein intimacy information of the at least one third NF or the at least one sub-instance of the third NF is stored in the first NF; and sending a service discovery response to the second NF, wherein the service discovery response comprises information of the at least one third NF or at least one sub-instance of the third NF, wherein the information of the at least one third NF or at least one sub-instance of the third NF within the service discovery response is to be used by the second NF to select one of the at least one third NF or the at least one sub-instance of the third NF as a target NF.

14. A non-transitory computer readable storage medium containing instructions, which when executed by a processor, are capable of performing: sending a service discovery request to a first network function (NF) in a network system from a second NF, wherein the service discovery request comprises intimacy information of the second NF, wherein the intimacy information of the second NF comprises at least one of: data center information; receiving a service discovery response from the first NF, wherein the service discovery response comprises information of at least one third NF or at least one sub-instance of the third NF stored in the first NF, wherein the service discovery response is based on intimacy between the at least one third NF or the at least one sub-instance of the third NF and the second NF; and selecting one of the at lease one third NF or the at least one sub-instance of the third NF as a target NF based on the information of at least one third NF or at least one sub-instance of the third NF in the service discovery response.

15. A non-transitory computer readable storage medium containing instructions, which when executed by a processor, are capable of performing: sending, to a first network function (NF) in a network system, intimacy information of a third NF or a sub-instance of the third NF; and receiving, from a first NF, a response of acknowledgement for storing of the intimacy information in the first NF, wherein the intimacy information of the third NF or the sub-instance of the third NF comprises data center information; wherein the intimacy information of the third NF or the sub-instance of the third NF is to be stored in the first NF and to be utilized in a service discovery procedure in which a service discovery response is sent based on the third NF or the sub-instance of the third NF, and intimacy between a second NF, intimacy information of which is included in a service discovery request, and wherein information of the third NF or sub-instance of the third NF within the service discovery response is to be used by the second NF to select one of the third NF or the sub-instance of the third NF as a target NF.

16. A non-transitory computer readable storage medium containing instructions, which when executed by a processor, are capable of performing: receiving: at a first network function (NF) in a network system, intimacy information of a third NF from the third NF, or receiving intimacy information of a sub-instance of the third NF from the sub-instance of the third NF; and storing the intimacy information in the first NF; wherein the intimacy information comprises data center information, wherein upon receiving a service discovery request from a second NF, a service discovery response is sent to the second NF, wherein the third NF or the sub-instance of the third NF is discovered based on intimacy between the second NF and the third NF or the sub-instance of the third NF, and wherein information of the third NF or sub-instance of the third NF in the service discovery response is to be used by the second NF to select one of the third NF or the sub-instance of the third NF as a target NF.

* * * * *

UNITED STATES PATENT AND TRADEMARK OFFICE
CERTIFICATE OF CORRECTION

PATENT NO. : 11,283,687 B2
APPLICATION NO. : 16/342526
DATED : March 22, 2022
INVENTOR(S) : Wang et al.

It is certified that error appears in the above-identified patent and that said Letters Patent is hereby corrected as shown below:

In the Drawings

In Fig. 15, Sheet 10 of 17, delete "1520 Service discovery result (target NF or service)" and insert -- 1522 Service discovery result (target NF or service) --.

In Fig. 15, Sheet 10 of 17, insert Main Designator -- 1500 --.

In Fig. 16, Sheet 11 of 17, insert Main Designator -- 1600 --.

In the Specification

In Column 4, Lines 34-35, delete "disclosure." and insert -- disclosure; --, therefor.

In Column 4, Line 37, delete "disclosure." and insert -- disclosure; --, therefor.

In Column 4, Line 39, delete "disclosure." and insert -- disclosure; --, therefor.

In Column 5, Line 11, delete "(LTE), and/or other suitable," and insert -- (LTE), --, therefor.

Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,283,687 B2

In Column 6, Line 10, delete "liming" and insert -- limiting --, therefor.

In Column 7, Line 14, delete "registration its" and insert -- registration of its --, therefor.

In Column 12, Line 46, delete "though" and insert -- through --, therefor.

In Column 12, Line 48, delete "in detailed" and insert -- in detail --, therefor.

In Column 18, Line 65, delete "according its" and insert -- according to its --, therefor.

In Column 19, Line 53, delete "entry" and insert -- entry. --, therefor.

In Column 19, Line 59, delete "according its" and insert -- according to its --, therefor.

In Column 23, Line 67, delete "over all" and insert -- overall --, therefor.

In the Claims

In Column 26, Line 62, in Claim 7, delete "a registration request," and insert -- the registration request, --, therefor.

In Column 27, Line 34, in Claim 11, delete "a registration request," and insert -- the registration request, --, therefor.

In Column 28, Line 16, in Claim 14, delete "at lease" and insert -- at least --, therefor.

In Column 28, Line 41, in Claim 16, delete "receiving:" and insert -- receiving, --, therefor.